(12) United States Patent
Foster et al.

(10) Patent No.: US 11,781,767 B2
(45) Date of Patent: Oct. 10, 2023

(54) APPARATUSES, SYSTEMS, AND METHODS FOR GAS LEAK DETECTION

(71) Applicant: Honeywell International Inc., Charlotte, NC (US)

(72) Inventors: Philip Foster, Plano, TX (US); Martin John Willett, Waterlooville (GB); Aoife Celoria, Quinlan, TX (US)

(73) Assignee: Honeywell International Inc., Charlotte, NC (US)

(*) Notice: Subject to any disclaimer, the term of this patent is extended or adjusted under 35 U.S.C. 154(b) by 189 days.

(21) Appl. No.: 17/345,698

(22) Filed: Jun. 11, 2021

(65) Prior Publication Data
US 2022/0397298 A1    Dec. 15, 2022

(51) Int. Cl.
| | | |
|---|---|---|
| *F24F 11/36* | (2018.01) | |
| *F24F 11/64* | (2018.01) | |
| *F24F 11/89* | (2018.01) | |
| *F24F 11/88* | (2018.01) | |
| *F24F 13/28* | (2006.01) | |
| *F24F 110/76* | (2018.01) | |

(52) U.S. Cl.
CPC .............. *F24F 11/36* (2018.01); *F24F 11/64* (2018.01); *F24F 11/88* (2018.01); *F24F 11/89* (2018.01); *F24F 13/28* (2013.01); *F24F 2110/76* (2018.01)

(58) Field of Classification Search
CPC .. F24F 11/33; F24F 11/36; F24F 11/64; F24F 11/88; F24F 11/89; F24F 13/28; F24F 2110/76; G01M 3/04
See application file for complete search history.

(56) References Cited

U.S. PATENT DOCUMENTS

| | | | | |
|---|---|---|---|---|
| 11,041,647 | B2 * | 6/2021 | Weinert | F25B 49/025 |
| 2015/0362204 | A1 * | 12/2015 | Goel | F24F 11/36 |
| | | | | 62/180 |
| 2018/0321121 | A1 * | 11/2018 | Rydkin | F25B 49/005 |
| 2021/0108819 | A1 * | 4/2021 | Chen | F24F 3/001 |
| 2021/0207830 | A1 * | 7/2021 | Chen | F24F 11/36 |
| 2021/0263492 | A1 * | 8/2021 | Kamei | A23B 7/148 |
| 2021/0364180 | A1 * | 11/2021 | Chen | G01M 3/04 |
| 2022/0128267 | A1 * | 4/2022 | Tsuji | F24F 1/0043 |
| 2022/0316745 | A1 * | 10/2022 | Brauer | F24F 11/30 |
| 2022/0349600 | A1 * | 11/2022 | Alfano | F24F 11/49 |

* cited by examiner

*Primary Examiner* — Nelson J Nieves
(74) *Attorney, Agent, or Firm* — Alston & Bird LLP

(57) ABSTRACT

Methods, apparatuses, and systems for providing a position sensing component are disclosed herein. An example sensor assembly may comprise: a primary sensing device, a reference sensing device located in proximity to the primary sensing device; and a flue coupled with one of the primary sensing device and the reference sensing device to provide a pathway for a first gas in a first area to access the one of the primary sensing device and the reference sensing device. The one of the primary sensing device and the reference sensing device is coupled to the flue and is configured to determine a first concentration level of the first gas in the first area. The other of the primary sensing device and the reference sensing device is configured to determine a second concentration level of the first gas in a second area.

20 Claims, 22 Drawing Sheets

US 11,781,767 B2

APPARATUSES, SYSTEMS, AND METHODS FOR GAS LEAK DETECTION

TECHNOLOGICAL FIELD

This disclosure generally relates to methods, systems, and associated sensor assemblies for monitoring gas leaks and, more specifically, to sensor assemblies for monitoring and detecting refrigerant gas leaks.

BACKGROUND

Refrigeration units include refrigerant coils that contain flammable refrigerants. Due to the flammability of the refrigerants, leaks may be dangerous and therefore need to be detected before a sufficient amount of refrigerant leaks, providing the potential for fire or explosions. Through applied effort, ingenuity, and innovation, many of these identified problems have been solved by developing solutions included in embodiments of the present disclosure, many examples of which are described in detail herein.

The foregoing illustrative summary, as well as other exemplary objectives and/or advantages of the disclosure, and the manner in which the same are accomplished, are further explained in the following detailed description and its accompanying drawings

SUMMARY

In accordance with various examples of the present disclosure, various example methods, apparatuses, and systems for monitoring gas leaks may be provided.

In some examples, a sensor assembly may be provided. The sensor assembly may comprise: a primary sensing device, a reference sensing device located in proximity to the primary sensing device; and a flue coupled with one of the primary sensing device and the reference sensing device to provide a pathway for a first gas in a first area to access the one of the primary sensing device and the reference sensing device. In some examples, the one of the primary sensing device and the reference sensing device is coupled to the flue and is configured to determine a first concentration level of the first gas in the first area. In some examples, the other of the primary sensing device and the reference sensing device is configured to determine a second concentration level of the first gas in a second area.

In some examples, the reference sensing device and is configured to receive the determined first gas concentration level of a first gas and second gas concentration level of a second gas from the primary sensing device and the reference sensing device, compare the first gas concentration level and the second gas concentration level to determine a reading difference, and based on the comparison, in an instance in which the second gas concentration level and the first gas concentration level have a reading difference greater than a predetermined threshold difference to cause a transmission that a leak of the first gas is occurring.

In some examples, the primary sensing device and the reference sensing device are exposed to identical exposure of environmental variables. In some examples, the sensor assembly further comprises a filter positioned on one side of the flue, wherein the filter is configured to screen out one or more gases from reaching the reference sensing device. In some examples, the primary sensing device is adapted to be exposed to a potential leak source and the reference sensing device is adapted to be exposed to an environment other than the potential leak source under identical environmental variables.

In some examples, the threshold difference is based on between 5% and 10% of a volume of the first gas. In some examples, the threshold difference is based on a flammability level of the first gas. In some examples, the first gas is a refrigerant. In some examples, the sensor assembly is further configured to receive one or more environmental variables and correcting the first gas concentration level reading and the second gas concentration level reading based on the environmental variables.

In some examples, the control circuitry comprising at least one processor, the at least one processor having computer coded instructions therein, with the computer instructions configured to, when executed, provide an alert signal. In some examples, the sensor assembly is a fully analog system or a digital system. In some examples, a size of the flue is designed such that a mean free path of the gases being sensed is not encroached.

In some examples, a diameter of the flue is about 100 times the mean free path. In some examples, a response time of the sensing is adapted to remain within acceptable limits based on a length of the flue, wherein the length of the flue is about 0.1 meter to 3 meters.

In some examples, a method of determining a gas leak with a sensor assembly may be provided. In some examples, the sensor assembly may comprise a primary sensing device and a reference sensing device. In some examples, the method may comprise determining, via a flue extension coupled with a reference sensing device, a first gas concentration level of a first gas in a given area; determining, via a primary sensing device, a second gas concentration level of a second gas in the given area; comparing, using a control circuitry, the determined first gas concentration level and the second gas concentration level; and based on the comparison, in an instance in which the first gas concentration level reading and the second gas concentration level reading have a measured difference greater than a predefined threshold difference, causing a transmission of a differential output that a gas leak is occurring.

In some examples, the method includes exposing each of the primary sensing device and the reference sensing device to identical environmental variables, wherein the environmental variables include at least one of temperature, pressure, and humidity. In some examples, the flue extension is configured to screen out one or more target gases from reaching the reference sensing device. In some examples, the primary sensing device is adapted to be exposed to a potential leak source and the reference sensing device is adapted to be exposed to an environment other than the potential leak source under identical environmental variables.

In some examples, a diameter of the flue is about 10 times a mean free path of one or more target gases. In some examples, the method includes receiving one or more environmental variables and correcting the first gas concentration level reading and the second gas concentration level reading based on the environmental variables. In some examples, the method is carried out via at least one processor.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

Corresponding reference characters indicate corresponding parts throughout the several views of the drawings.

DETAILED DESCRIPTION

Figure 1:
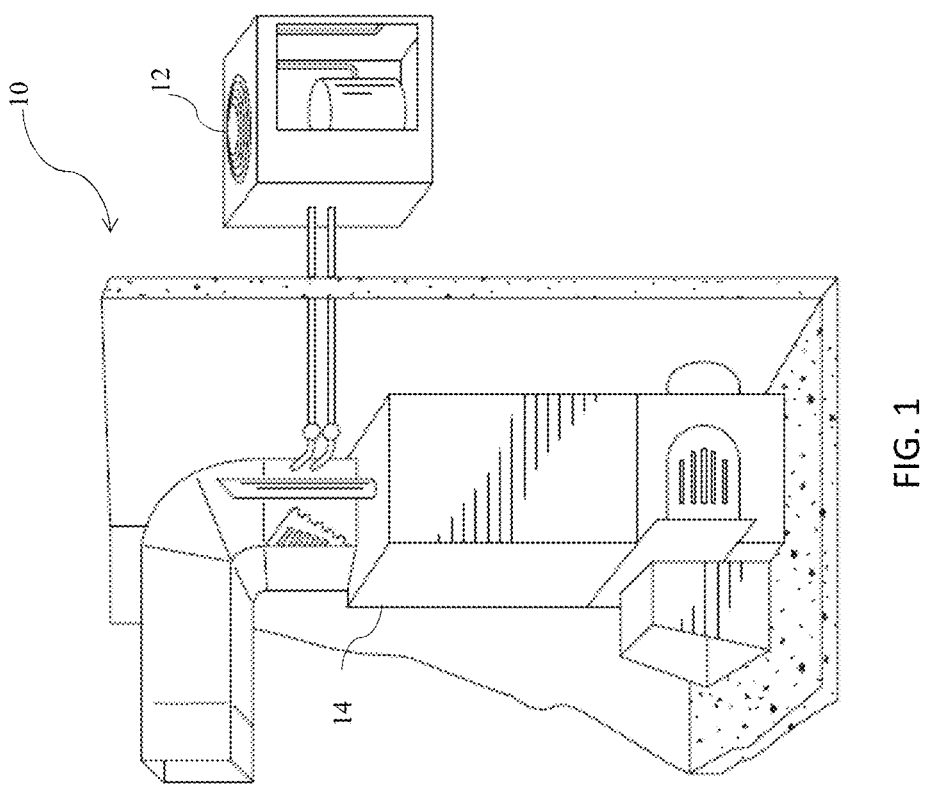
FIG. 1 illustrates an example schematic diagram of a standard heating, ventilation, and air conditioning unit (HVAC) system.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein. Instead, these embodiments are provided so that this disclosure will satisfy applicable legal requirements. Like numbers refer to like elements throughout. The terminology used in this patent is not meant to be limiting insofar as devices described herein or portions thereof may be attached or utilized in other orientations.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Various embodiments discussed herein allow for monitoring and detection of gas leaks, such as in Heating, Ventilation, and air conditioning (HVAC) units during operation. In some examples, such refrigerants include safety class A2L refrigerants such as but are not limited to R-410A, R-1234yf, R-1234ze, R-32, R-454A, R-404A, R-454C, R-455A, R-447 A, R-452B, R-454B, and/or the like. A2L refrigerants/one or more refrigerant gases are being used more often in such refrigeration units due to a lower global warming potential (GWP), and therefore regulations have been put into place in various countries to monitor leakage to avoid dangerous conditions during use. While A2L refrigerants have generally low toxicity and only mild flammability, large leaks can still cause dangerous situations. Therefore, monitoring and detection of such leaks are, in some examples, necessary for refrigerant units.

Generally, the A2L refrigerants have a vapor density greater than ambient air. Therefore, the refrigerants settle under gravity at the lowest points of the refrigeration units. Hence, the monitoring and detection of the gases need to be performed at the lowest points (in a gravitational force direction) of the refrigeration unit.

Various example embodiments of the present disclosure allow for a simple yet effective leakage monitoring system. Additionally, as the monitoring systems may continuously receive outputs from sensors to allow the monitoring systems to provide a self-check feature to verify that the monitoring system is operational.

While various embodiments discuss refrigeration units, various embodiments discussed herein may also be used for other types of gas leaks, such as in heating, ventilation, and air conditioning (HVAC) applications, fire suppression systems, and/or the like using closed-loop cycles. For example, other such examples include, but are not limited to inert gas leaks, natural gas leaks, propane gas leaks, butane gas leaks, carbon monoxide gas leaks, hydrocarbon gas leaks, and/or the like. Various embodiments discussed herein allow for the detection of large-scale leaks. For example, gas leaks at or above approximately 1% volume per volume.

FIG. 1 is a schematic diagram of a standard heating, ventilation, and air conditioning unit (HVAC) system 10. The HVAC system 10 is an example embodiment that may be included or associated with any of a variety of computing devices or sensing devices. The HVAC system 10 includes a condenser unit 12 and an air handler or conduit unit 14.

Figure 2:
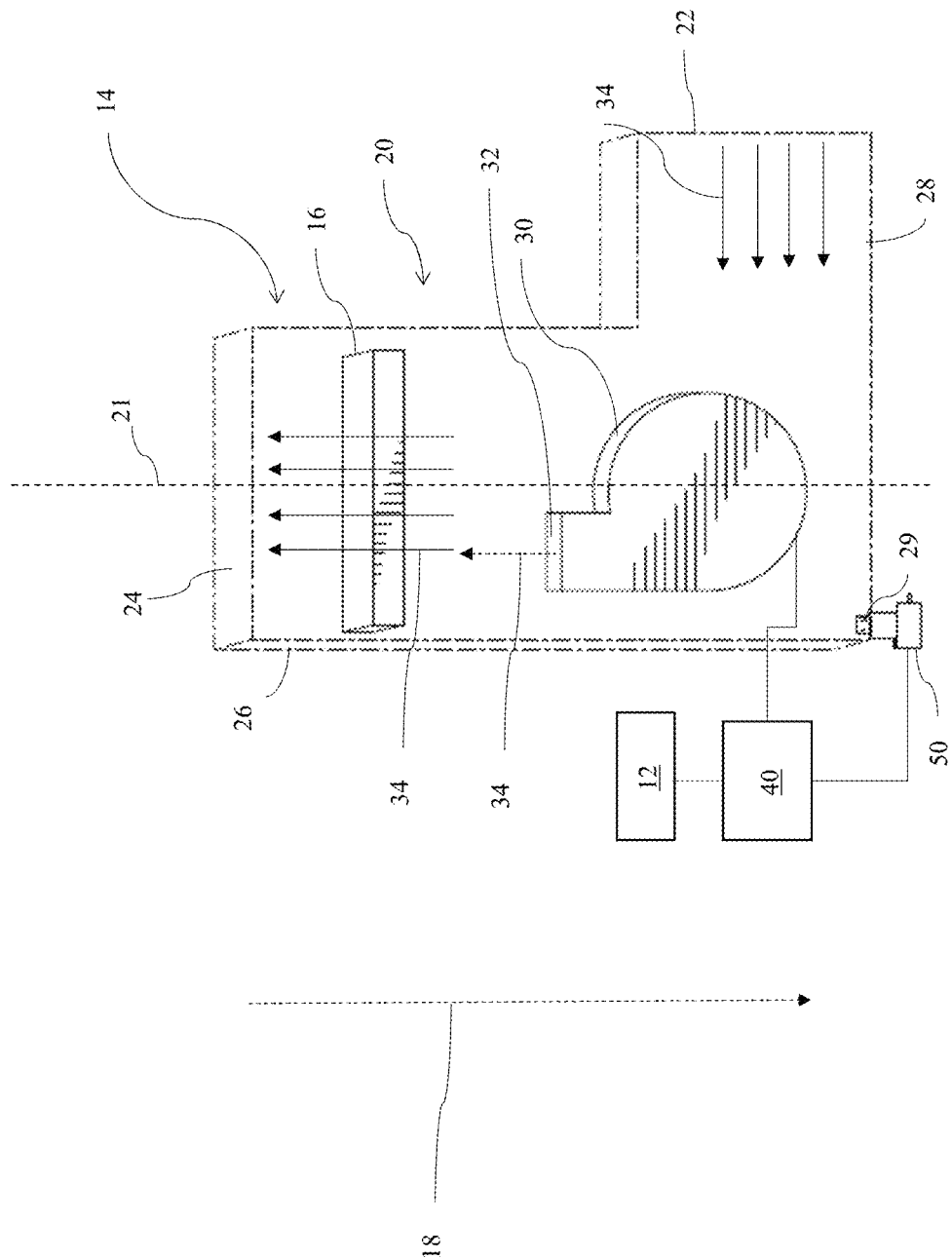
FIG. 2 illustrates an example schematic diagram of a conduit unit, in accordance with one or more embodiments of the present disclosure.

One of the condenser unit 12 and conduit unit 14 may include suitable logic and/or circuitry that may enable the condenser unit 12 to facilitate cooling and/or heating of the ambient air (flowing through the HVAC system 10). For example, as shown in FIG. 2, the condenser unit 12 may include a plurality of cooling/refrigerating pipes 16 fluidly coupled to a compressor (not shown). The compressor may cause one or more refrigerant gases to flow through the plurality of cooling pipes. In some examples, a portion of the plurality of cooling pipes 16 may be positioned within the conduit unit 14. Conduit unit 14 may be configured to facilitate the flow of the ambient air over the portion of the plurality of cooling pipes positioned within the conduit unit 14. The portion of the cooling pipes may facilitate the cooling/heating of the ambient air. The structure of the conduit unit 14 is further described in FIG. 2.

FIG. 2 illustrates a schematic diagram of the conduit unit 14, in accordance with one or more embodiments of the present invention. The conduit unit 14 includes a conduit 20, a blower or fan 30, a control unit 40, and a sensor assembly 50. In some embodiments, the control unit 40 may be communicatively coupled to the blower 30 and the sensor assembly 50.

Conduit 20 has a conduit inlet 22 and a conduit outlet 24. The conduit inlet 22 is configured to receive ambient air from the environment. In some embodiments, the conduit inlet 22 may be fluidly coupled to additional conduits (not shown), wherein each additional conduit is configured to supply ambient air into the conduit 20. Additionally, or alternatively, the conduit inlet 22 may be fluidly coupled to other components of the HVAC system 10 that are configured to supply ambient air to the conduit 20. In an example embodiment, the conduit outlet 24 may be configured to provide conditioned air to other components of the HVAC system 10. In some embodiments, conduit 20 may be defined by one or more walls defining a periphery of the conduit 20.

The conduit 20 of FIG. 2 includes at least a first wall 26 and a floor 28. The first wall 26 extends parallel to a vertical axis 21 of the conduit unit 14. The vertical axis 21 is defined as being parallel to the gravitational force 18. In some embodiments, floor 28 is coupled to the first wall 26 and extends perpendicularly to the vertical axis 21.

The blower 30 may be positioned within the conduit 20 to facilitate the flow of the ambient air through the conduit 20 and force ambient air over the plurality of cooling/refrigerating pipes 16. The blower 30 has a blower opening 32 through which ambient air is pushed, causing an airflow 34 through the conduit 20. In some embodiments, the blower 30 may include suitable logic and/or circuitry (not shown) to control the speed and volume of airflow 34. The blower 30 may have the blower opening 32 that faces the first end 228 of the flushing tube 170. The blower 30 may be configured to be periodically activated in order to blow the ambient gases into the flushing tube 170.

In this embodiment, the blower 30 flushes the sensor assembly 50 every time the blower 30 is run. Constantly flushing the sensor assembly 50 clears the system of gases and maintains the sensor assembly 50 baselined to the same level of refrigerant gas after each time the blower 30 is run. This is to ensure that that the sensor assembly 50 is sampling the same refrigerant gas concentration as that located within the conduit 20.

In another embodiment, the blower 30 may be connected with the sensor assembly 50. In this embodiment, the blower 30 is configured to produce an airflow through the sensor assembly 50 to flush the sensor assembly 50. The blower 30 of this embodiment may be located within the conduit 20 and be mechanically coupled to the sensor assembly 50 and be installed as a part of the sensor assembly 50. In this embodiment, activation of the blower 30 is initiated by a signal from the control system 40.

In still another embodiment, the blower 30 may be connected with the sensor assembly 50 and located outside of the conduit 20. In this embodiment, the blower 30 may be mechanically coupled to the sensor assembly 50 and be installed as a part of the sensor assembly 50. The blower 30 of this embodiment is configured to produce an airflow through the sensor assembly 50.

The control unit 40 may include suitable logic and/or circuitry communicatively coupled to, the blower 30, and the sensor assembly 50. In some embodiments, the control unit 40 may be coupled to the condenser unit 12. The control unit 40 may be coupled to and configured to control the operations of the HVAC system 10. For example, the control unit 40 may be configured to activate/deactivate the blower 30 and otherwise control blower 30 to adjust the speed and volume of airflow 34 within the conduit 20. The control unit 40 may be implemented as an Application Specific Integrated Circuit (ASIC) or Field Programmable Gate Array (FPGA). In some embodiments, the control unit 40 may include electronic, electromechanical, and mechanical technologies. The structure and the operation of the control unit 40 will be described later in conjunction with FIG. 6.

In another embodiment, the control unit 40 is not configured to control the operations of the HVAC system. In this embodiment, the control unit 40 may be configured to control an airflow through sensor assembly 50.

The sensor assembly 50 is coupled to the conduit 20 through a floor opening 29 in floor 28. The sensor assembly 50 is located below the portion of the plurality of cooling pipes 16 positioned within the conduit 20. In some embodiments, the sensor assembly 50 may be located directly below the portion of the plurality of cooling pipes 16 positioned within the conduit 20. In other embodiments, floor 28 may include a trough (not shown) or other structure to direct the flow of gases into the sensor assembly 50. In still other embodiments, the sensor assembly 50 may include a structure such as a trough or a funnel to be placed inside the conduit to direct the flow of gases into the sensor assembly 50.

The sensor assembly 50 may be coupled to the control unit 40 and be configured to provide a signal to the control unit 40 when specific predefined gases are detected by the sensor assembly 50. In an alternative embodiment, the sensor assembly 50 may be coupled to the control unit 40 and be configured to provide a signal to the control unit 40 when a specific predefined gas is not detected by the sensor assembly 50.

As such, the control unit 40 may be configured to monitor the signal received from the sensor assembly 50. Based on the monitoring of the signal from the sensor assembly 50, the control unit 40 may be configured to activate/deactivate the blower 30 or adjust the speed and volume of airflow 34 through the conduit 20 based on the signal from the sensor assembly 50. In another embodiment, the control unit 40 may be configured to automatically activate/deactivate the blower 30 without any intervention or association with the signal from the sensor assembly 50.

Figure 3:
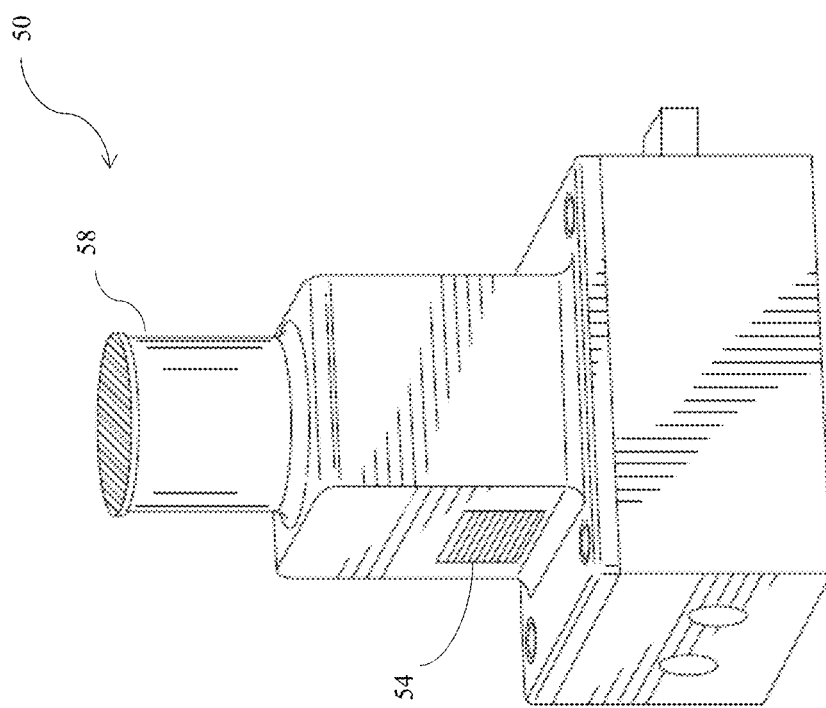
FIG. 3 illustrates an example schematic diagram of a sensor assembly in accordance with an example embodiment of the present disclosure.

FIG. 3 illustrates a schematic of the sensor assembly 50, according to embodiments illustrated herein.

Figure 4:
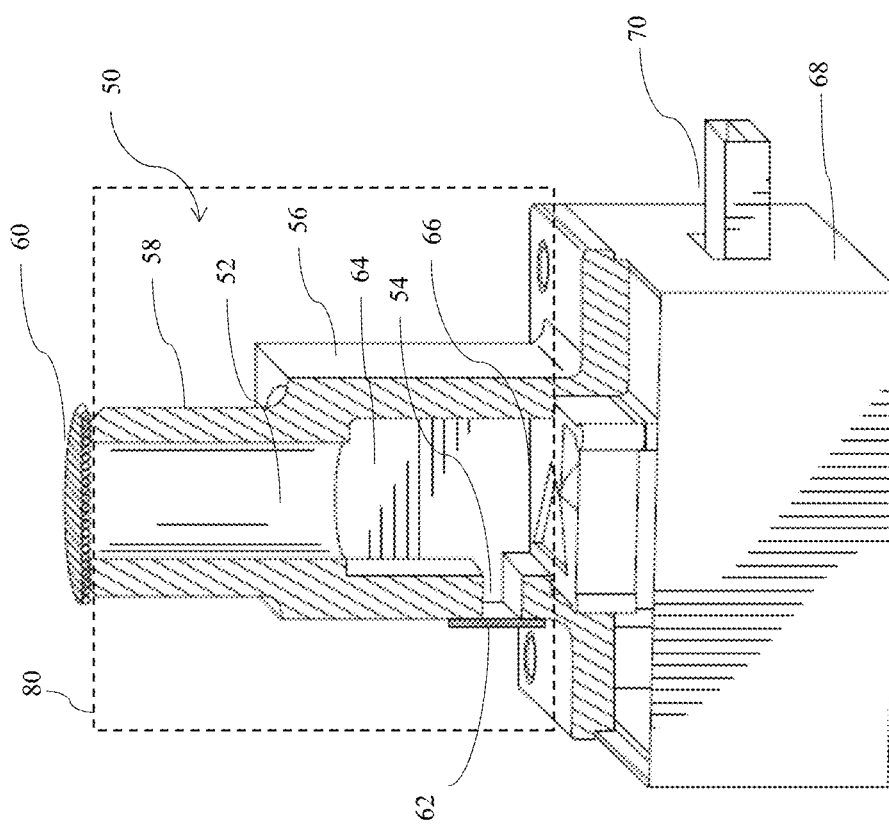
FIG. 4 illustrates an example partial schematic of the sensor assembly for use in accordance with an example embodiment of the present disclosure.

FIG. 4 illustrates a sectional view of the sensor assembly 50 when a plane 80 cuts the sensor assembly 50, according to one or more embodiments illustrated herein. The sensor assembly 50 includes a first opening 52 and a second opening 54. The first opening 52 is coupled to a sampling tube 58. In an example embodiment, the sampling tube 58 is received within the floor opening 29 (shown in FIG. 2) in floor 28. The sensor assembly 50 includes a first filter unit 60 located over the first opening 52 and a second filter unit 62 located over the second opening 54. In some examples, the first filter unit 60 may be configured to restrict dust particles and moisture from entering within the sensor assembly 50.

The sensor assembly 50 defines a chamber 64 between the first opening 52 and the second opening 54. Chamber 64 is adjacent to a gas sensor 66. The gas sensor 66 is disposed adjacent to and is connected with the electrical circuitry 68. In some examples, the gas sensor 66 may be disposed within chamber 64. In some examples, the gas sensor 66 is placed along a side wall 56 of the first opening 52 or chamber 64. The gas sensor 66 may be embodied as a plurality of gas concentration sensors configured for detecting the concentration of one or more gaseous fluids. In various embodiments, as discussed below, the gas concentration sensors may be electrochemical sensors configured to monitor the concentration of one or more refrigerant gases.

The sensor assembly 50 may include a connection port 70. The connection port 70 may be a USB or other standard electrical connector. The connection port 70 may be used to connect to one of the control unit 40 or other device for data collection device.

Figure 5:
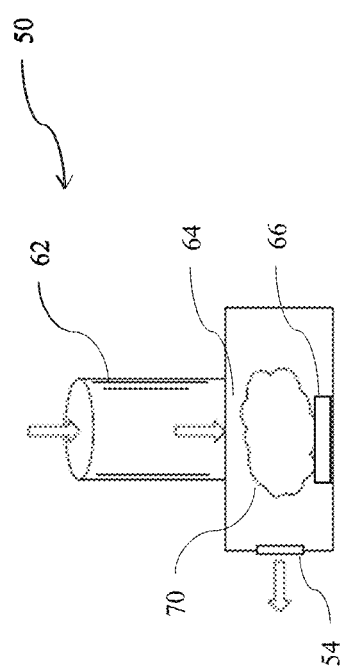
FIG. 5 illustrates an example sectional view of the sensor assembly in accordance with an example embodiment of the present disclosure.

FIG. 5 illustrates a fluid flow diagram within the sensor assembly 50. During operation, one or more refrigerant gases 70 pass through the sampling tube 62 into chamber 64 to reach the gas sensor 66. The gas sensor 66 detects the presence of the one or more refrigerant gases 70. Owing to a higher vapor density, the one or more refrigerant gases 70 may tend to slowly move within the sensor assembly 50 before egress from the second opening 54.

In some embodiments, the second filter 62 may be a check valve to restrict the ingress of air, from the surroundings of the sensor assembly 50, into the gas sensor assembly. The second filter 62 may include a structure to restrict the egress of one or more refrigerant gases to allow a concentration of one or more refrigerant gases to build up over time. In these embodiments, the second filter 62 may allow one or more refrigerant gases to be dispelled from the sensor assembly 50 by a flow of ambient air, forming a positive pressure created by the activation of the blower 30.

In some examples, the scope of the disclosure is not limited to having a single sensor assembly or a sensor assembly having a single gas sensor coupled to the conduit. In an example embodiment, multiple sensor assemblies 50 may be coupled to the conduit 20 without departing from the scope of the disclosure. In another example embodiment, the sensor assembly 50 may include multiple gas sensors 62. Further, the scope of the disclosure is not limited to sensing one or more refrigerant gases to determine a leak in the plurality of refrigeration coils. In an example embodiment, the sensor assembly 50 may be configured to determine a concentration of oxygen to determine the leakage of one or more refrigerant gases, as is further described in FIG. 14-22.

In various embodiments, as discussed below, the gas sensor 66 may be an electrochemical sensor configured to monitor the concentration of one or more refrigerant gases, oxygen, or other gas that will be depleted as the one or more gaseous fluids builds up in the sensor. For example, one or more of the gas concentration sensors may be a fuel-cell liquid electrolyte electrochemical sensor. In various embodiments, the gas concentration sensors may employ having a plurality of electrodes, such as a sensing electrode, a reference electrode, and a counter electrode. The sensor also includes an electrolyte that is disposed over at least a portion of each electrode in order to form an ionic pathway. One or more leads can be coupled by electrical conductors such as wires to the electrodes on the sensing element. The leads may extend through and be embedded within the housing. The sensor also includes a capillary/path that can be disposed of through a substrate to allow a gas to diffuse/pass to the sensing electrode and/or the electrolyte. The electrodes allow for various reactions to take place to allow a current or potential to develop in response to the presence of a target gas. The resulting signal may then allow for the concentration of the target gas to be determined. Various sensors may be used in embodiments of the present disclosure, such as a liquid electrolyte electrochemical (e.g., Consumable anode (battery) or fuel cell pump), High-Temperature Solid electrolyte electrochemical (e.g., Zirconia or other oxygen ion conductor), and/or Fluorescence Quenching (e.g., ruthenium-based dye), optical sensors, Non-Dispersive Infrared (NDIR) sensors, optical sensors, thermal sensors, semiconductor sensors, or the like. While the sensors discussed herein are referred to as gas concentration sensors, the sensing devices discussed herein may take the form of partial pressure sensors.

The electrical circuitry 60 of an example embodiment may also optionally include a communication interface that may be any means such as a device or circuitry embodied in either hardware or a combination of hardware and software that is configured to receive and/or transmit data from/to other electronic devices in communication with the sensor assembly, such as by near field communication (NFC) or other proximity-based techniques. Additionally, or alternatively, the communication interface may be configured to communicate via cellular or other wireless protocols, including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

In various embodiments, at least a portion of the sensor assembly 50 may be disposed in proximity to the portion of the plurality of cooling pipes 16 within the HVAC system 10. For example, at least the sensor assembly 50 (shown in FIG. 1) may be proximate to the portion of the plurality of cooling pipes 16, and the electrical circuitry 68 may be disposed elsewhere.

In various embodiments, the sensor assembly 50 may be placed in sufficient proximity, such that a leakage of gas (e.g., refrigerant) may result in a change of the oxygen concentration. In some embodiments, the sensor assembly 50 may be disposed at a location proximate to an area of the portion of the plurality of cooling pipes 16 in which leakages occur more than other locations. For example, gas leaks may occur more often at connection between different tubing. In various embodiments, the sensor assembly 50 may be disposed within the HVAC system 10 or the like, such that any gas leak may reach the sensor assembly 50.

Under passive conditions (no airflow through the sensor assembly 50), gases that are heavier than air flows through the opening in the floor 29 and into the sampling tube 58 of the sensor assembly 50. The heavier than air gases collect in the chamber 64, in the vicinity of the gas sensor 66. This will happen irrespective of whether the concentration in the sampled area had subsequently changed due to either the leak stopping or remedial dilution, which will provide inaccurate sensor readings. As such, it is important to be able to flush the sensor assembly 50 without compromising the gas sensor's ability to receive and respond to leaking gas.

Figure 6:
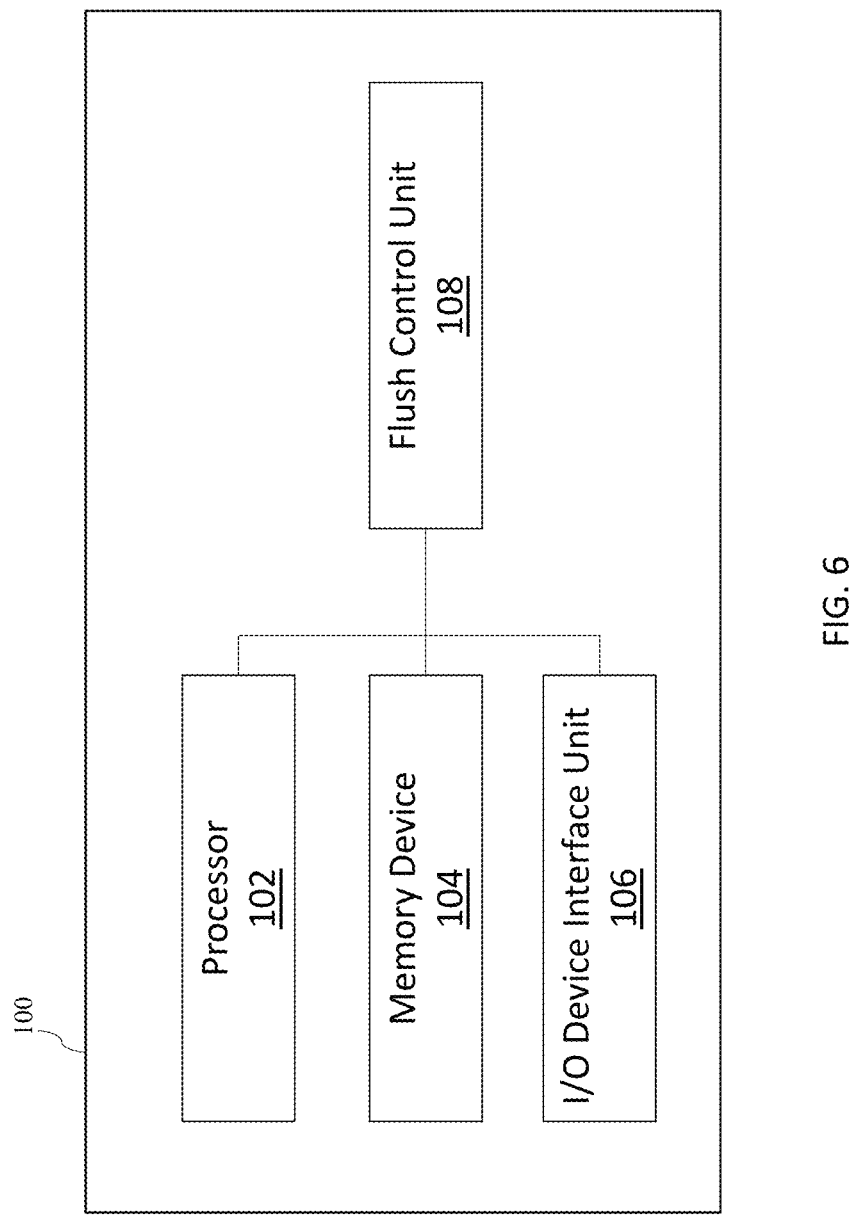
FIG. 6 illustrates an example block diagram of a control unit in accordance to embodiments of the present disclosure.

FIG. 6 illustrates a block diagram 100 of a control unit 40, according to one or more embodiments described herein. Control unit 40 includes a processor 102, a memory device 104, an Input/Output (I/O) device interface unit 106, a flush control unit 108.

The processor 102 may be embodied as one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Although illustrated in FIG. 6 as a single processor, in an embodiment, processor 102 may include a plurality of processors and signal processing modules. The plurality of processors may be embodied on a single electronic device or may be distributed across a plurality of electronic devices collectively configured to function as the circuitry of the HVAC system 10. The plurality of processors may be in operative communication with each other and may be collectively configured to perform one or more functionalities of the circuitry of the HVAC system 10, as described herein. In an example embodiment, the processor 102 may be configured to execute instructions stored in the memory device 104 or otherwise accessible to the processor 102. These instructions, when executed by processor 102, may cause the circuitry of the HVAC system 10 to perform one or more of the functionalities as described herein.

Whether configured by hardware, firmware/software methods, or by a combination thereof, the processor 102 may include an entity capable of performing operations according to embodiments of the present disclosure while configured accordingly. Thus, for example, when processor 102 is embodied as an ASIC, FPGA, or the like, the processor 102 may include specifically configured hardware for conducting one or more operations described herein. Alternatively, as another example, when the processor 102 is embodied as an executor of instructions, such as may be stored in the memory device 104, the instructions may specifically configure the processor 102 to perform one or more algorithms, and operations described herein.

Thus, the processor 102 used herein may refer to a programmable microprocessor, microcomputer, or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory or a mixture of both. The memory can also be located internal to another computing resource (e.g., enabling computer-readable instructions to be downloaded over the Internet or another wired or wireless connection).

The memory device 104 may include suitable logic, circuitry, and/or interfaces that are adapted to store a set of instructions that is executable by processor 102 to perform predetermined operations. Some of the commonly known memory implementations include, but are not limited to, a hard disk, random access memory, cache memory, read-only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read-only memory (CD-ROM), digital versatile disc read-only memory (DVD-ROM), an optical disc, circuitry configured to store information, or some combination thereof. In an example embodiment, the memory device 104 may be integrated with the processor 102 on a single chip without departing from the scope of the disclosure.

The I/O device interface unit 106 may include suitable logic and/or circuitry that may be configured to communicate with the one or more components of the HVAC system 10, in accordance with one or more device communication protocols such as, without limitation, I2C communication protocol, Serial Peripheral Interface (SPI) communication protocol, Serial communication protocol, Control Area Network (CAN) communication protocol, and 1-Wire® communication protocol. In an example embodiment, the I/O device interface unit 106 may communicate with the sensor assembly 50 and the blower 30. Some examples of the I/O device interface unit 106 may include, but are not limited to, a Data Acquisition (DAQ) card, an electrical drives driver circuit, and/or the like.

Figure 7:
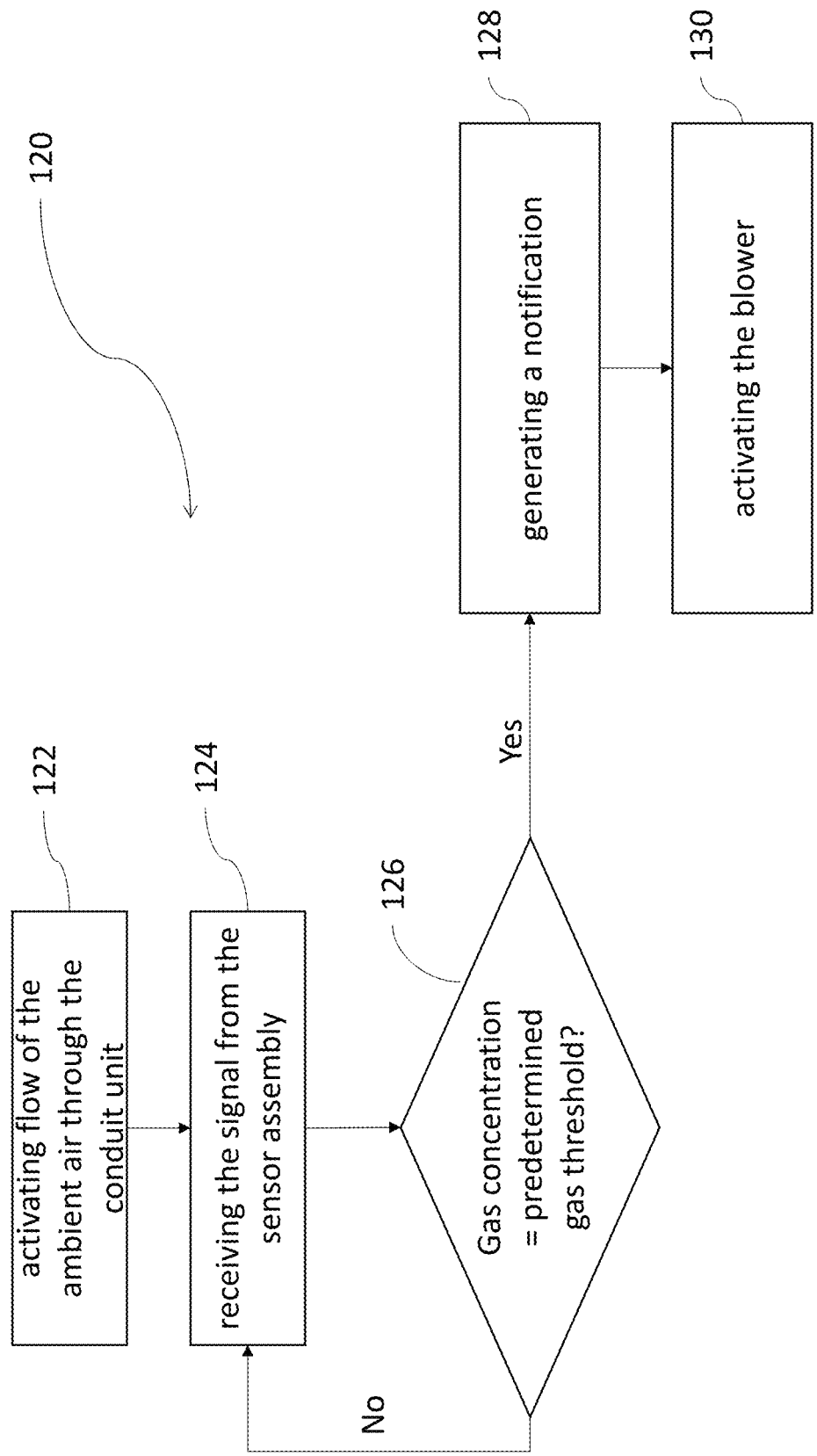
FIG. 7 illustrates an example flowchart of a method for operating the HVAC, for use in accordance with an example embodiment of the present disclosure.

The flush control unit 108 may include suitable logic and/or circuitry that may be configured to monitor the signal received from the sensor assembly 50, as is further described in FIG. 7.

In an example embodiment, the signal may be indicative of a concentration of gas accumulated within the sensor assembly 50. For example, the signal may be indicative of the concentration of one or more refrigerant gases accumulated within the sensor assembly 50. Based on the concentration of the gas within the sensor assembly 50, the flush control unit 108 may be configured to activate/deactivate the blower 30, as is further described in FIG. 7. The flush control unit 108 may be implemented as ASIC or FPGA without departing from the scope of the disclosure.

With additional reference to FIG. 7, which illustrates flowchart 120 of a method for operating the HVAC system 10, according to embodiments illustrated herein, at step 122, the HVAC system 10 includes means such as a control unit 40, a processor 102, and the flush control unit 108 for activating the blower 30 to produce the airflow 34 of the ambient air through the conduit 20.

The plurality of cooling pipes 16 located within the conduit 20 and coupled to the condenser unit 12 are configured to modify the temperature of the ambient air. In some examples, due to leakage in the plurality of cooling pipes 16, one or more refrigerant gases may leak into the conduit unit 14. Since one or more refrigerant gases are heavier than the ambient air, one or more refrigerant gases may fall from the plurality of cooling pipes 16 and accumulated along the floor 28 or bottom of the conduit 20.

At step 124, the HVAC system 10 includes means such as a control unit 40, a processor 102, and the flush control unit 108 for receiving the signal from the sensor assembly 50. The signal is indicative of the concentration of one or more refrigerant gases in the sensor assembly 50. In an example embodiment, processor 102 is configured to determine the concentration of one or more refrigerant gases based on the received signal. In another example embodiment, the sensor assembly 50 may be configured to generate the signal corresponding to the concentration of one or more refrigerant gases in the sensor assembly 50.

At step 126, the HVAC system 10 includes means such as a control unit 40, a processor 102, and the flush control unit 108 for comparing the determined concentration of the gas with a predetermined gas threshold value. In an example embodiment, the predetermined gas threshold value may correspond to the threshold above which the concentration of one or more refrigerant gases is determined to be dangerous/harmful. In an example embodiment, the predetermined gas threshold value may be predefined during the manufacturing of the HVAC. If the flush control unit 108 determines that the concentration of one or more refrigerant gases is less than the predetermined gas threshold value, the flush control unit 108 may be configured to repeat step 124. However, if the flush control unit 108 determines that the concentration of one or more refrigerant gases is greater than the predetermined gas threshold value, the flush control unit 108 may be configured to generate a notification signal, as shown in step 128. The predetermined gas threshold may be either a maximum threshold or a minimum threshold. The predetermined gas threshold may indicate a presence of one or more refrigerant gases or the lack of one or more non-refrigerant gases, such as oxygen.

At step 128, the HVAC system 10 includes means such as a control unit 40, a processor 102, and the flush control unit 108 for generating a notification signal that the gas threshold exceeds a threshold value. In an example embodiment, the notification may be transmitted to a user/operator of the HVAC to indicate the one or more refrigerant gases are leaking.

At step 130, the HVAC system 10 includes means such as a control unit 40, a processor 102, and the flush control unit 108 for activating the blower 30. The blower 30 is set to run for a predetermined amount of time. Once the blower has been activated, the sensor assembly 50 will receive the ambient air from the conduit 20 to flush or remove leaked one or more refrigerant gases from the sensor assembly 50. The ambient air may include a mixture of the leaked one or more refrigerant gases and the air or only the ambient air present inside the conduit 20.

After the blower 30 is activated for the predetermined amount of time, step 124 will be repeated. The controller 40 may be programmed to compare one or more signals from the sensor assembly 50 over a predetermined timeframe and provide a warning notification signal that the HVAC system 10 requires maintenance. The controller 40 provides warning of the presence of refrigerant gases and triggers the one or more signals to initiate preventative measures to reduce the possibility of the build-up of a dangerous gas mixture within the conduit 20.

In some embodiments, the warning notification signal includes one of location information, gas concentration information, and sensor assembly fault information. In some embodiments, the warning notification signal may include one of auditory and visual signals. In some embodiments, the warning notification signal may regulate the blower 30 to prevent the buildup of one or more refrigerant gases within the HVAC system 10.

Activation/operation of the blower 30 during the normal operation of the HVAC system 10 provides a regular cleaning of the sensor assembly 50 by forcing ambient air through the sensor assembly 50. This regular cleaning of the sensor assembly 50 prevents the sensor assembly from becoming poisoned by continually flushing ambient air through the sensor assembly and removing one or more refrigerant gases that may have leaked within the HVAC system 10. Further, such an operation also reduces the possibility of false positives due to the constant presence of one or more refrigerant gases.

Figure 8:
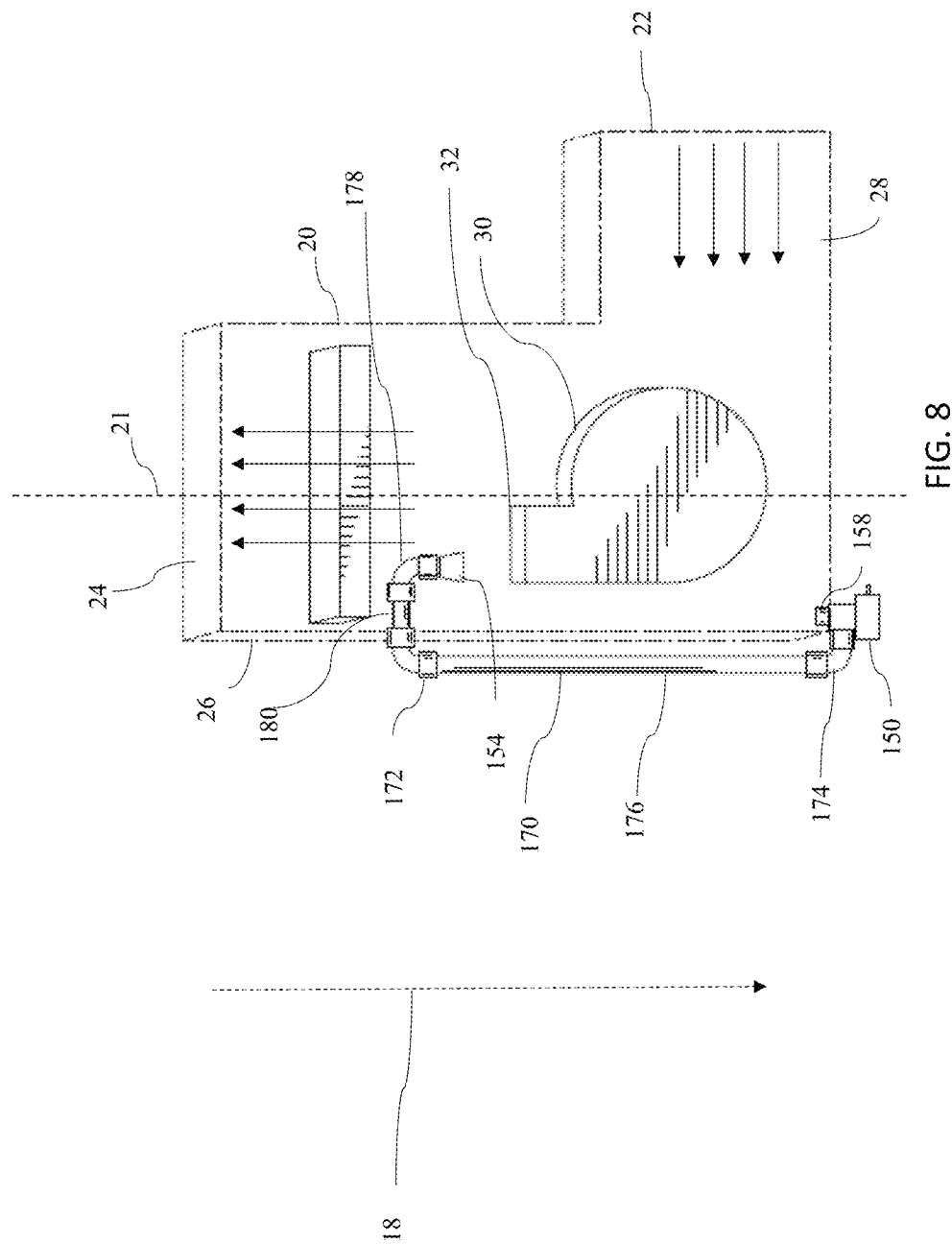
FIG. 8 illustrates an example schematic diagram of a conduit unit, in accordance with another embodiment of the present disclosure.

FIG. 8 illustrates a schematic diagram of the conduit unit 14, in accordance with one or more embodiments of the present invention. The conduit unit 14 of FIG. 8 includes conduit 20, the blower 30, and the control unit 40 shown in FIG. 2, and a sensor assembly 150.

The sensor assembly 150 includes a sampling tube 158 and a flushing tube 170. The sensor assembly 150 is fluidly coupled to the conduit 20 through both the sampling tube 158 and flushing tube 170. The sampling tube 158 is fluidly coupled to the conduit 20 through a floor opening 29 in floor 28. The flushing tube 170 is fluidly coupled to the conduit 20 through a wall opening 27 in the first wall 26. In an example embodiment, at least a portion of the flushing tube 170 may be positioned external to the conduit 20.

In an example embodiment, the flushing tube 170 may include a first end 172, a second end 174, and a middle portion 176. The first end, 172 of the flushing tube 170, is fluidly coupled to the second opening of the sensor assembly 150. The second end 174 of the flushing tube 170 may include an internal portion 180 is positioned internal to the conduit 20 and is configured to collect the airflow 34 of ambient air. In some examples, the second end 174 of the flushing tube 170 may define a bend 178 that causes the second end 174 of the flushing tube 170 to face along a direction of the airflow 34.

In some embodiment, the second end 174 of the flushing tube 170 may be positioned to face the blower opening 32 of blower 30. The blower 30 may be configured to be periodically activated to blow the ambient gases into the flushing tube 170.

Figure 9:
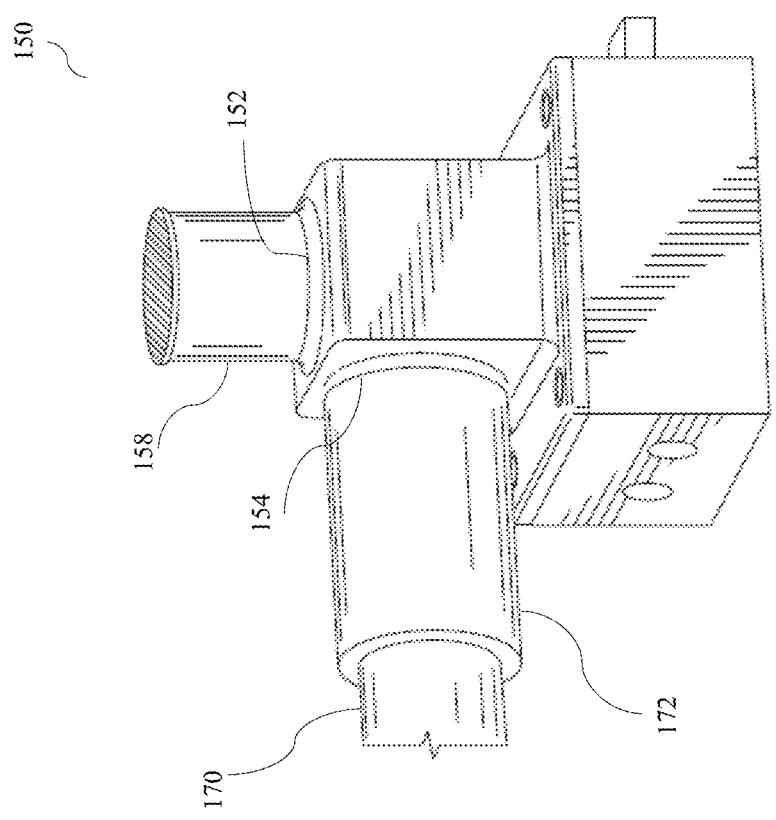
FIG. 9 illustrates an example schematic diagram of the sensor assembly in accordance to embodiments of the present disclosure.

FIG. 9 illustrates a schematic of the sensor assembly 150, according to embodiments illustrated herein. The sensor assembly 150 includes a first opening 152, and a second opening 154. The first opening 152 is coupled to a sampling tube 58, and the second opening 154 is coupled to the second end 174 of the flushing tube 170.

In an example embodiment, the sampling tube comprising a plurality of capillaries to allow diffusion of the one or more gases therethrough.

Figure 10:
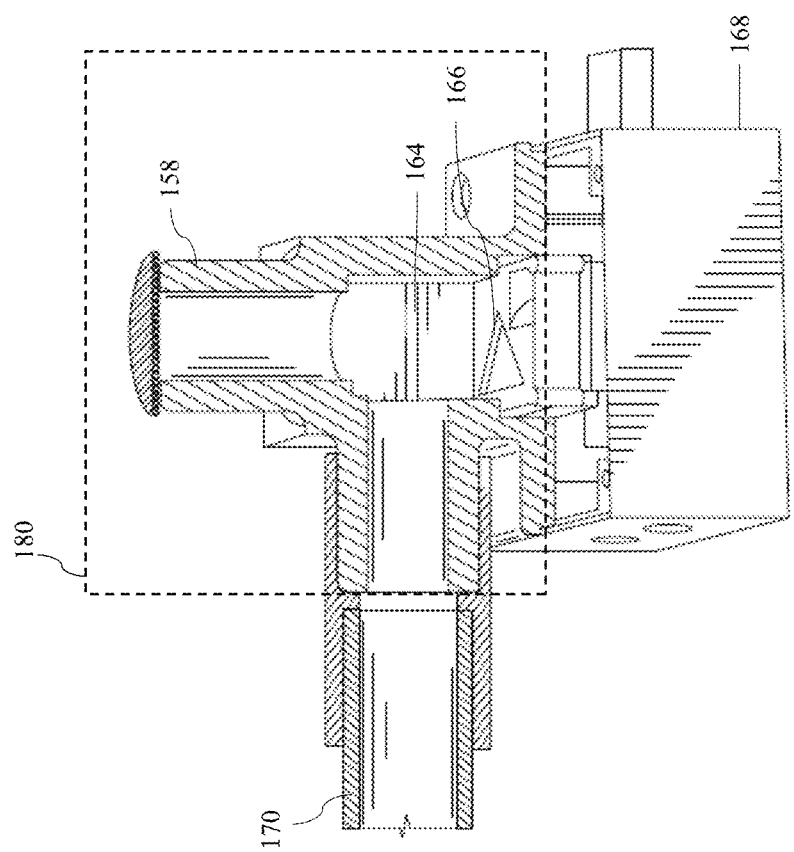
FIG. 10 illustrates an example cross-sectional view of the sensor assembly for use in accordance with an example embodiment of the present disclosure.

FIG. 10 illustrates a sectional view of the sensor assembly 150 when a plane 180 cuts the sensor assembly 150, according to one or more embodiments illustrated herein. The sensor assembly 150 includes a first filter unit 160, a gas sensor 166, an electrical circuitry 168, and may a second filter unit (not shown). The gas sensor 166 is disposed on top of the electrical circuitry 168. The gas sensor 166 is exposed to the flushing tube 170 and the sampling tube 158. The gas sensor 166 may be disposed in a direction perpendicular to one or more refrigerant gases entering within the gas sensor 166. In an example embodiment, the gas sensor 166 may be disposed in a direction parallel to the direction of ingress of one or more refrigerant gases. In an example embodiment, the first opening 152 comprises the first filter unit 160 and the second opening 54 may include the second filter unit (not shown), the first filter unit and the second filter unit are configured to screen out dust and moisture from the one or more gases reaching the sensor assembly. In some examples, the sensor assembly 150 may define chamber 164, where the flushing tube 170 and the sampling tube 158 are fluidly coupled to chamber 164. In some examples, the gas sensor 166 is located within chamber 164.

Figure 11:
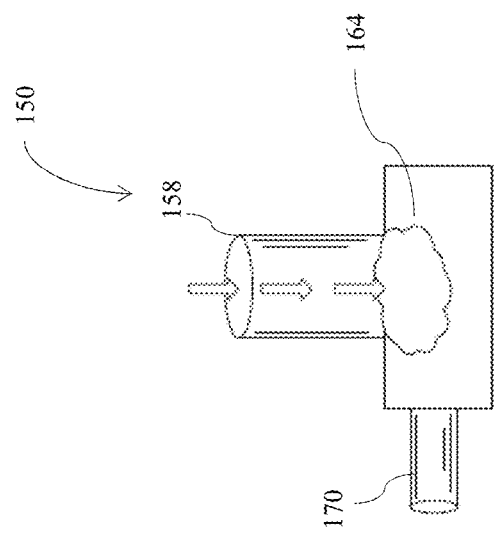
FIG. 11 illustrates an example fluid flow diagram within the sensor assembly, in accordance to embodiments of the present disclosure.

FIG. 11 illustrates a fluid flow diagram within the sensor assembly 150, according to embodiments illustrated herein. During operation, when the blower 30 is not activated, the one or more refrigerant gases pass through the sampling tube 158 into chamber 164 and reaches the gas sensor 166 and the gas sensor 166 detects the presence of the one or more refrigerant gases. Owing to a higher vapor density, the one or more refrigerant gases may tend to accumulate within the sensor assembly 150.

Figure 12:
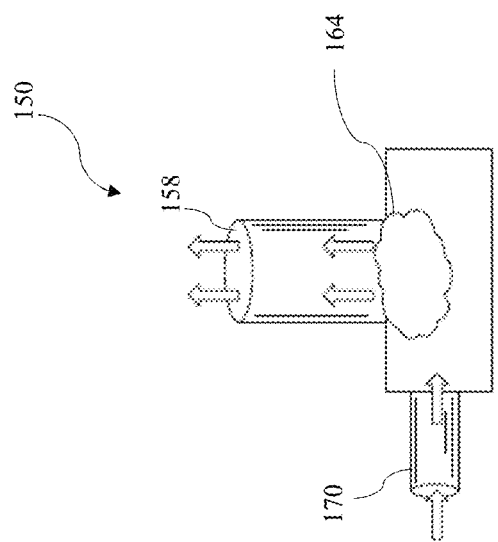
FIG. 12 illustrates an example fluid flow diagram within the sensor assembly for use in accordance with an example embodiment of the present disclosure.

FIG. 12 illustrates a fluid flow diagram within the sensor assembly 150, according to embodiments illustrated herein. During operation, when the blower 30 is actuated, the flushing tube 170 would receive ambient air from the conduit 20, which would move under the influence of the blower toward chamber 164. Owing to the pressure of the ambient air in the flushing tube 170, the flushing tube 170 facilitates the flow of the ambient air to the chamber to evacuate one or more refrigerant gases therefrom. Also, the pressure of the ambient air in the flushing tube 170 evacuates one or more refrigerant gases from chamber 164 and the gas sensor 504. Such a movement of the mixture of ambient air and the residual one or more refrigerant gases would be well below a threshold, and the sensor assembly may not be affected by the residual one or more refrigerant gases. Thus, reducing the possibility of poisoning of the gas sensor 166 and/or reducing the changes of inaccuracies of the sensor readings.

Figure 13:
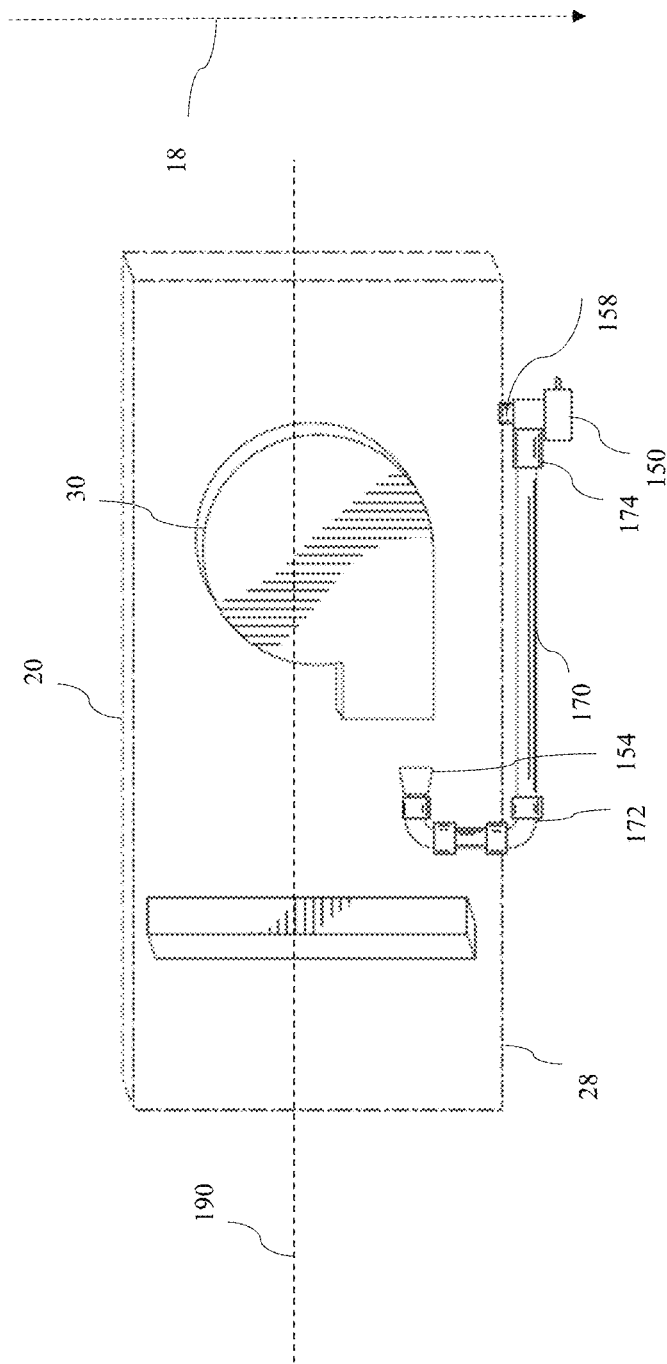
FIG. 13 illustrates an example schematic diagram of a conduit for use in accordance with another example embodiment of the present disclosure.

In some examples, the scope of the disclosure is not limited to the positioning of the flushing tube 170 with respect to the conduit 20. In an example embodiment, the positioning of the flushing tube 170 may vary based on the orientation of the conduit 20 without departing from the scope of the disclosure. One such example is illustrated in FIG. 13. In the illustrated embodiment of FIG. 13, both the sampling tube 158 and flushing tube 170 are fluidly coupled to a floor of the conduit 20.

In another embodiment, the flushing tube 170 may include heat exchanging vanes to cool down the ambient air entering the sensor assembly 50.

In an example embodiment, the sampling tube comprising a plurality of capillaries to allow diffusion of the one or more gases therethrough.

Refrigerant gases have been shown to leak through the walls and underneath air handler units as well. Another advantage is that the flushing action removes refrigerant from the flue and the sensor, which also distributes fresh air around the outlet of the sensor. Thus, the flushing action dilutes the concentration of the leaked refrigerant collecting in that area, serving as a safety mitigation factor. This is shown in FIG. 13 as an outlet at the right side of the sensor housing. In some embodiments, the flushing tube 170 may extend substantially parallel to a horizontal axis 190 of the conduit 20. This advantage applies to any HVAC systems with a confined space underneath leak points where the gas can collect, concentrate over time, and present an explosion or fire concern.

In some examples, the scope of the disclosure is not limited to having one sensor assembly coupled to the conduit. In an example embodiment, the multiple sensor assemblies may be coupled to the conduit 20, without departing from the scope of the disclosure. Further, the scope of the disclosure is not limited to sensing the one or more refrigerant gases to determine a leakage in the plurality of refrigeration coils. In an example embodiment, the sensor assembly 150 may be configured to determine a concentration of oxygen to determine the leakage of the one or more refrigerant gases, as is further described in FIG. 14-22.

Figure 14:
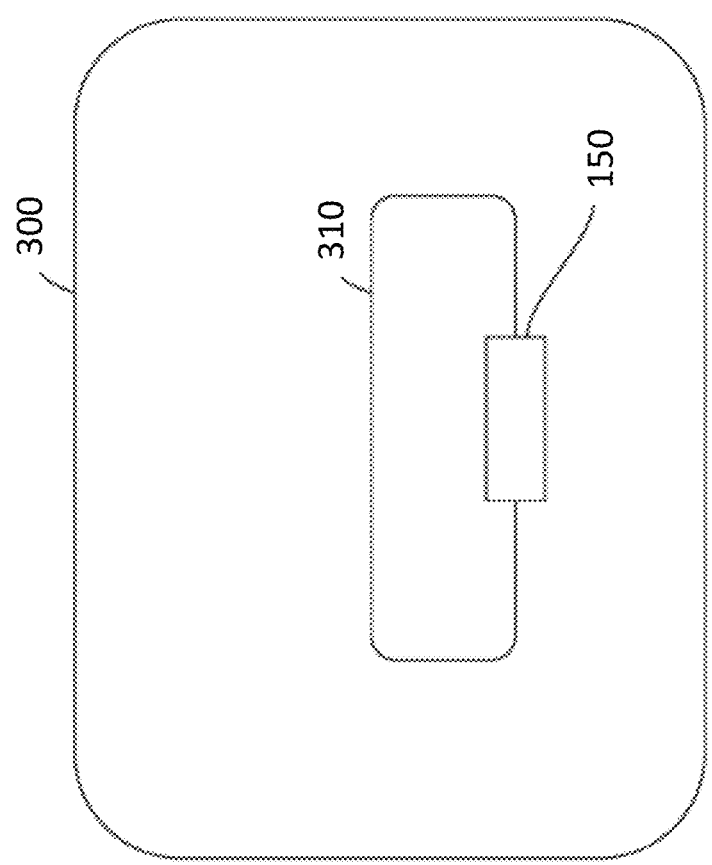
FIG. 14 illustrates an example block diagram of an HVAC configured in accordance with an example embodiment of the present disclosure.

FIG. 14 illustrates the HVAC 300 in accordance with various embodiments of the present disclosure. As shown, the HVAC 300 may include one or more closed-loop gas (e.g., refrigerant) coils 310 and sensor assembly 150. In various embodiments, at least a portion of the sensor assembly 150 may be disposed in proximity to the given closed-loop gas coil 310 within the HVAC 300. For example, at least the sensor assembly 150 (shown in FIG. 1) may be proximate to the closed-loop gas coils 310 and the electrical circuitry may be disposed elsewhere.

In various embodiments, the sensor assembly 150 may be placed in sufficient proximity, such that a leakage of gas (e.g., refrigerant) may result in a change of the oxygen concentration. In some embodiments, the sensor assembly 150 may be disposed at a location proximate to an area of the closed-loop gas coils 310 in which leakages occur more than other locations. For example, gas leaks may occur more often at connection between different tubing. In various embodiments, the sensor assembly 150 may be disposed with the HVAC 300 or the like, such that any gas leak may reach the sensor assembly 150.

Figure 15:
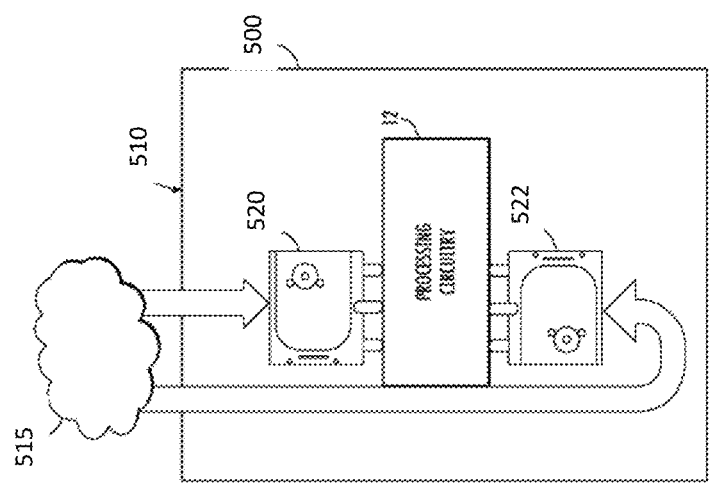
FIG. 15 illustrates a schematic diagram of the sensor assembly for use in accordance with an example embodiment of the present disclosure.

FIG. 15 is an example configuration of a sensor assembly 500 in accordance with another example embodiment. As shown, a primary sensing device 520 and a reference sensing device 522 may be disposed within the sensor assembly 500. In various embodiments, the sensor assembly 500 may be oriented such that the coil surface 510 is proximate to the closed-loop gas coil 310 and a gas (e.g., refrigerant) leakage 515 in an instance such a leakage occurs. As such, the primary sensing device 520 and the reference sensing device 522 may be disposed at common position, provided the reference sensing device is exposed to ambient air with the help of a flue extension. In some embodiments, there may be a trade-off in performance between the leak location, gas movement, sensor location, sensitivity, and response time of the sensing device. The response time being defined as the time for a sensor to respond from no load to a step change in load.

In some embodiments, the sensor assembly 500 may include a single sensor to allow positioning of the sensor away from the gas leakage 515. In this embodiment, the sensor assembly 500 may include a single NDIR sensor.

In various embodiments any gas leakage 515 may reach the primary sensing device 520 before the reference sensing device 522. The primary sensing device 520 and reference sensing device 522 are configured to determine the presence of one or more target gases, for example, oxygen, carbon dioxide, the refrigerant, or another gas. As such, the first oxygen concentration level reading captured by the primary sensing device 520 may be altered due to the gas leak (e.g., the oxygen concentration may decrease) before the second oxygen concentration level reading captured by the reference sensing device 522 is altered. As such, in an instance in which a leakage is occurring, the first oxygen concentration level reading may decrease more quickly than the second oxygen concentration level reading.

In some embodiments, the reference sensing device 522 may also be oriented differently from the primary sensing device 520, such that the gas flowing from the potential leak is inhibited from entering the reference sensing device 522 and not inhibited from entering the primary sensing device 520 (e.g., as the arrows in FIG. 15 shown, the target gas may flow directly into the primary sensing device 520, but may have to travel around the electrical circuitry 530 and the flue extension to access the reference sensing device 522). As such, the temporal effect of the gas flow may be more definitively shown by the outputs of each sensing device. In some embodiments, a potential leak may be defined as an area susceptible to leakage. For instance, in a refrigeration unit, the potential leakage locations may include braised joints, connections between tubing, areas under mechanical and/or thermal stress, and/or the like. In various embodiments, the potential leakage location may be determined via testing of specific applications.

In some embodiments, the reference sensing device 522 may be exposed to an ambient environment, such as ambient air that is outside of the sensor assembly 500 via the flue extension coupled with the reference sensing device 522. In this regard, the reference sensing device 522 may not receive any of the target gas during a leakage instance. In such an instance, the reference sensing device 522 may be located in an area with similar environmental conditions to the position of the primary sensing device 520. While FIG. 15 shows only a single primary sensing device 520 and a single reference sensing device 522, various embodiments may use more than two sensing devices disposed on a single PCB and at the same location (i.e. not spaced apart).

In various embodiments, at least a portion of the electrical circuitry 530 may be disposed within the sensor assembly 500. As shown, the primary sensing device 520 and/or the reference sensing device 522 may be connected to the electrical circuitry 530 via pins on the sensing devices configured to engage with sockets on the electrical circuitry 530. Various embodiments may employ different connection methods, such as pads configured on the sensing devices and pogo pins on the electrical circuitry 530. Various embodiments discussed herein may have any number of different standard electrical interconnects between the sensing devices and the electrical circuitry 530. In some embodiments, the primary sensing device 520 and/or the reference sensing device 522 may be equipped with short range communication capabilities to allow the sensing devices to communicate with the electrical circuitry 530 remotely. In various embodiments, the electrical circuitry 530 may be configured to receive oxygen concentration level readings from the primary sensing device 520 and the reference sensing device 522. In some embodiments, the electrical circuitry 530 may store one or more of the oxygen concentration level readings, such that the oxygen concentration level readings may be monitored over time (e.g., the first oxygen concentration level readings and the second oxygen concentration level readings may diverge over time due to a leak). In some embodiments, time sequence data may be used to determine leak instances. In various embodiments, the monitoring may be continuous. Alternatively, the monitoring may occur at intervals based on the gas leakage application (e.g., some gas leaks may not be as dangerous and intermittent monitoring may be cost saving).

Figure 16:
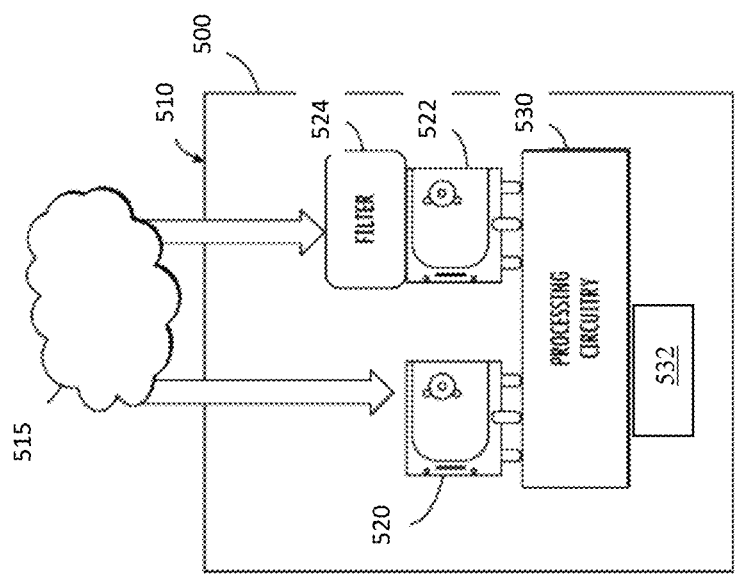
FIG. 16 illustrates a schematic diagram of the sensor assembly for use in accordance with an example embodiment of the present disclosure.

FIG. 16 is another example configuration of the sensor assembly 500 in accordance with an example embodiment. As shown, the primary sensing device 520 and the reference sensing device 522 may be disposed within the same sensor assembly 500. As shown, the primary sensing device 520 and the reference sensing device 522 may be disposed at the same position in the gas leak environment.

In some embodiments, the reference sensing device 522 may be equipped with a filter 524 configured to remove one or more target gases (e.g., refrigerants) from the gas entering the reference sensing device 522. In some embodiments, the filter 524 may be configured to absorb one or more target gases (e.g., one or more refrigerant gases) that pass therein. For example, the filter 524 may be an absorber. In some embodiments, the filter 524 may be positioned between the closed-loop gas coil 310 and the reference sensing device 522, such that any gas combination that reaches the reference sensing device has passed through the filter 524 (e.g., removing some or all of the one or more refrigerant gases).

In various embodiments, the filter 524 may be activated carbons of various types. In some such embodiments, the activated carbons may be impregnated with other chemicals depending on the species to be absorbed. In some embodiments, molecular sieves, zeolites, and/or other well know filter families may be used. In some embodiments, the target gas may dictate the design of the filter 524 (e.g., Sofnocarb powder may be used in an instance in which Butane is the target gas). In some embodiments, the filter 524 may be designed to absorb the target gas permanently or to slow down its passage to the reference sensing device, such that a temporal difference arises in the response compared to the primary sensing device.

In some embodiments, the primary sensing device 520 and the reference sensing device 522 may be a single sensor with a plurality of gas feeds. For example, the single sensor may have a primary sensing device gas feed without a filter 524 and a reference sensing device gas feed that may have a filter 524. In such an embodiment, the sensing device may have a mechanical switch configured to alternate access to a sensing electrode from the primary sensing device gas feed to the reference sensing device gas feed during operation. In such an embodiment, various pumping devices may be used to move the gas from the gas feeds to the sensing electrode. During operation, the mechanical switch may alternate between the primary sensing device gas feed and the reference sensing device gas feed and the differences between the first oxygen level reading from the primary sensing device gas feed and the second oxygen level reading may be compared as discussed herein with a two sensing device system.

In some embodiments, as gas (e.g., refrigerant) leaks, the first oxygen concentration level reading of the primary sensing device 520 may begin to decrease, while the second oxygen concentration level reading of the reference sensing device 522 remains approximately constant (or at least decreases more slowly). In some instances in which a gas leak is sufficiently large, the filter 524 may be become overwhelmed (e.g., fully saturated) at a specific point, such that the second oxygen concentration level reading of the reference sensing device 522 may begin to decrease in line with a sensing device without a filter. In such an embodiment, the time lag between the decrease of the first oxygen concentration level and the second oxygen concentration level may indicate that a gas leakage is occurring. Additionally, various other information may be determined via the individual outputs of the sensing devices.

In various embodiments, at least a portion of the electrical circuitry 530 may be disposed within the sensor assembly 500 as the primary sensing device 520 and the reference sensing device 522). As shown, the primary sensing device 520 and/or the reference sensing device 522 may be connected to the electrical circuitry 530 via pins on the sensing devices configured to engage with sockets on the electrical circuitry 530. Various embodiments may employ different connection methods, such as pads configured on the sensing devices and pogo pins on the electrical circuitry 530. Various embodiments discussed herein may have any number of different standard electrical interconnects between the sensing devices and the electrical circuitry 530. In some embodiments, the primary sensing device 520 and/or the reference sensing device 522 may be equipped with short range communication capabilities to allow the sensing devices to communicate with the electrical circuitry 530 remotely. In various embodiments, the electrical circuitry 530 may be configured to receive oxygen concentration level readings from the primary sensing device 520 and the reference sensing device 522. In some embodiments, the electrical circuitry 530 may store one or more of the oxygen concentration level readings, such that the oxygen concentration level readings may be monitored over time (e.g., the first oxygen concentration level readings and the second oxygen concentration level readings may diverge over time due to a leak). In various embodiments, the monitoring may be continuous. Alternatively, the monitoring may occur at intervals based on the gas leakage application (e.g., some gas leaks may not be as dangerous and intermittent monitoring may be cost saving).

Figure 17:
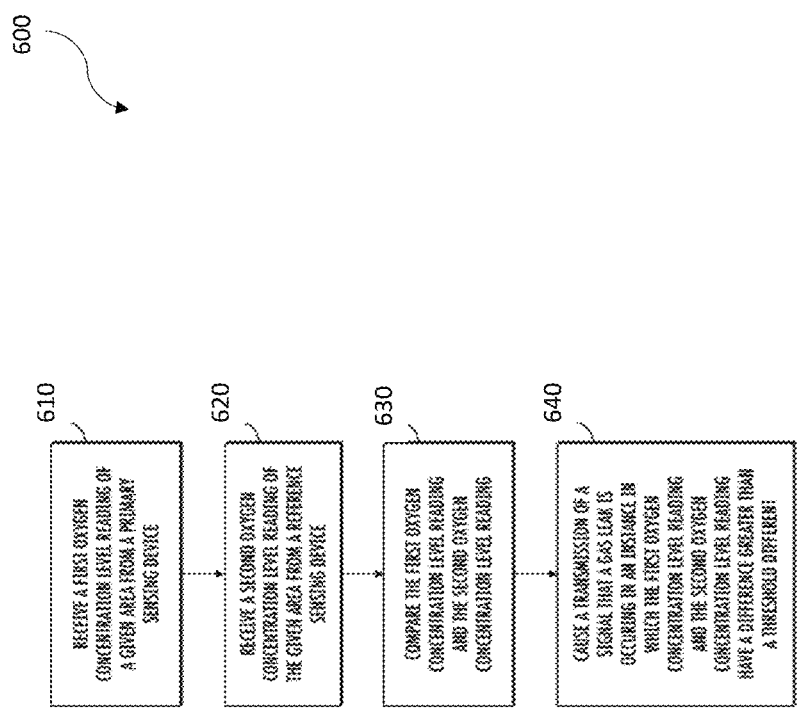
FIG. 17 illustrates an example flowchart of a method for operating the sensor assembly of FIG. 14, for use in accordance with an example embodiment of the present disclosure.

Referring now to FIG. 17, an example embodiment of the present disclosure includes a flow diagram 600 for the electrical circuitry 530, the processor 532, the sensor assembly 24, or the like, to monitor and detect a gas (e.g., refrigerant) leak. While various embodiments of the sensor assembly may include at least one processor 532, various embodiments of the sensor assembly may be analog systems, such that the primary sensing device 20 and the reference sensing device 22 may be in communication with a differential amplifier and/or ratio amplifier and use a comparator to determine an instance in which a leakage is occurring. As such, the operations of FIG. 17 may be carried out by an analog system.

Referring now to Block 610 of FIG. 17, the sensor assembly 500, such as the electrical circuitry 530, the processor 532, or the like, may include means for receiving a first oxygen concentration level reading of a given area. In various embodiments, as discussed above, the first oxygen concentration level reading may be captured by the primary sensing device 520. In various embodiments, the first oxygen concentration level reading may be affected by the environmental conditions, such as temperature or the like. Additionally, in some embodiments, the first oxygen concentration level reading may be affected by the introduction of new gases (e.g., such as a gas leak causing the oxygen concentration to decrease).

Referring now to Block 620 of FIG. 17, the sensor assembly 500, such as the electrical circuitry 530, the processor 532, or the like, may include means for receiving a second oxygen concentration level reading of the given area. In various embodiments, as discussed above, the first oxygen concentration level reading may be captured by the reference sensing device 522. In various embodiments, the reference sensing device 522 may be positioned in similar environmental conditions, such that the effects of the environmental conditions on the second oxygen concentration level reading may be similar or the same to the effects of the environmental conditions on the first oxygen concentration level reading.

In various embodiments, however, the reference sensing device 522 may be configured such that a gas leakage 515 may have a different effect on the second oxygen concentration level reading from the reference sensing device 522 than on the first oxygen concentration level reading from the primary sensing device 520. For example, in an instance in which the reference sensing device 522 is coupled with the flue which does not allow the leaking gas to pass through and reach the reference sensing device. The second oxygen concentration level reading may begin to decrease a time after the first oxygen concentration level reading begins to decrease, as the gas (e.g., refrigerant) may take longer to reach the reference sensing device 522. Alternatively, in an instance in which the reference sensing device 522 is equipped with a filter 524 (e.g., FIG. 16) or the flue, the second oxygen concentration level may not decrease, due to a gas leak, while the first oxygen concentration level may decrease due to said gas leak.

Referring now to Block 630 of FIG. 5, the sensor assembly 500, such as the electrical circuitry 530, the processor 532, or the like, may include means for comparing the first oxygen concentration level reading and the second oxygen concentration level reading. In various embodiments, the difference in the first oxygen concentration level reading and the second oxygen concentration level reading may correlate to the amount of gas leakage. In some embodiments, the comparison may be at a given time (e.g., at an instance in which the primary sensing device 520 has a lower oxygen concentration level reading than the reference sensing device 522). In some embodiments, the first oxygen concentration level reading and the second oxygen concentration level reading may be monitored over time, such that changes in the first oxygen concentration level reading and the second oxygen concentration level reading may indicate that a gas leak is occurring.

In an example analog embodiment, the primary sensing device 520 and the reference sensing device 522 may measure an output current, that is converted to a voltage, the individual output voltages may be amplified to eliminate any noise. As such, the voltages may be compared using either a differential or a ratio. In such an analog embodiment, a comparator may be used to determine a leak has occurred.

Referring now to Block 640 of FIG. 17, the sensor assembly 500, such as the electrical circuitry 530, the processor 532, or the like, may include means for causing a transmission of a signal that a gas (e.g., refrigerant) leak is occurring in an instance in which the first oxygen concentration level reading and the second oxygen concentration level reading have a reading difference greater than a threshold difference.

In various embodiments, the determination that a gas leak may be occurring may be based on the comparison of the first oxygen concentration level reading and the second oxygen concentration level reading. In some embodiments, the amount of target gas (e.g., refrigerant) allowable to leak may be based on the flammability of said gas. As such, the threshold difference may be lower than the flammability level of the target gas. For example, in an instance the flammability level is 10%, the threshold difference may be 1%. For example, a 1% change in the oxygen concentration (e.g., from 20.9% oxygen concentration to 20.7% oxygen concentration) may indicate 1% leakage gas (e.g., refrigerant) concentration. In various embodiments, the difference between the first oxygen concentration level reading and the second oxygen concentration level reading may correlate to the change in oxygen concentration (e.g., the primary sensing device 20 and the reference sensing device 22 may be configured such that only an introduction of the target gas (e.g., a gas leak) may cause the first oxygen concentration level reading and the second oxygen concentration level reading to differ substantially). In various embodiments, the threshold difference may be between approximately 5% and 10% of the volume of oxygen concentration level.

Figure 18:
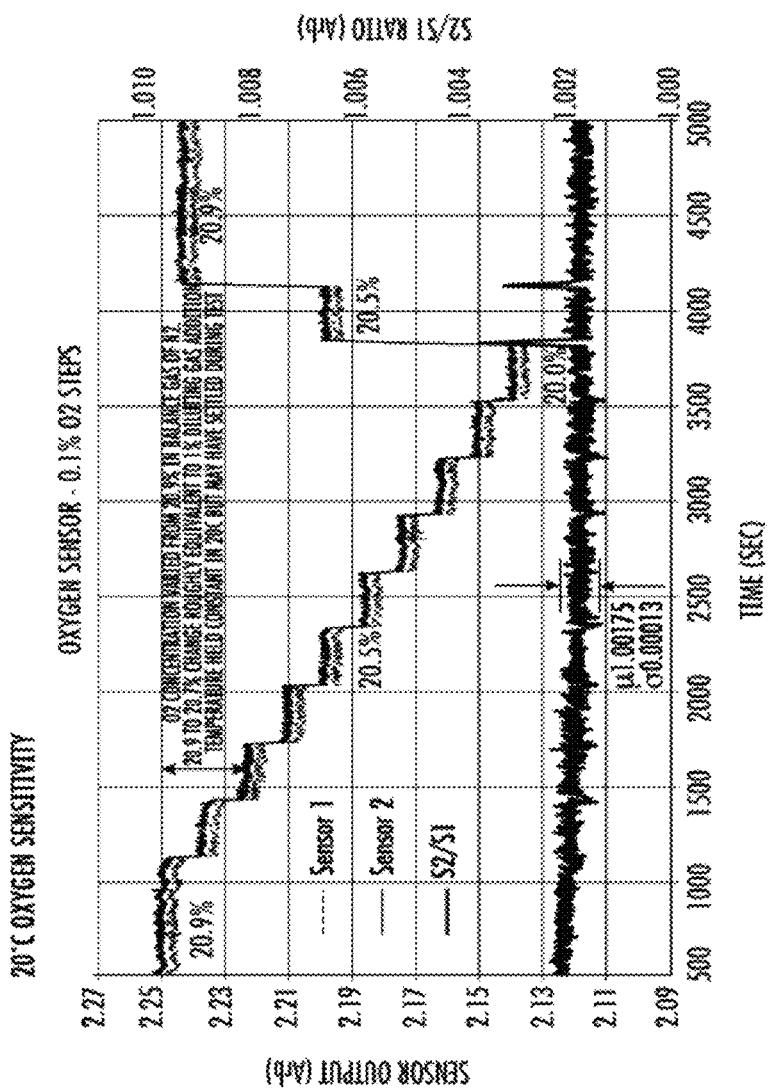
FIG. 18 is a graph showing the voltage outputs of two oxygen sensors during changes in the oxygen concentration level.

FIG. 18 is a graph showing the similar oxygen concentration readings of two sensors, such as the oxygen sensor used in various embodiments herein, during changes to the oxygen level in the air. As shown, the two sensors, which are being exposed to the same air, shown almost identical readings and therefore can be relied upon to shown substantial changes in the oxygen level. The S2/S1 line shown is the ratio of the Sensor 2 reading and the Sensor 1 reading. As shown, the ratio is approximately 1 and therefore any change to one of the sensor readings (e.g., in an instance a gas leakage occur and the primary sensing device 520 experiences a decrease in oxygen before the reference sensing device 522), may be represented by a change of the ratio from approximately 1.

Figure 19:
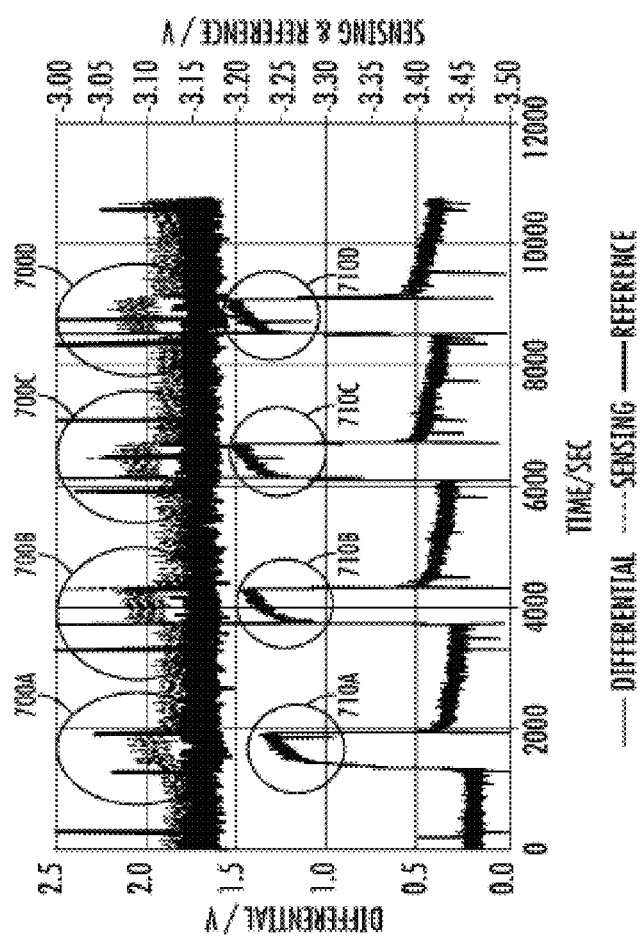
FIG. 19 is a graph showing results of testing using an example embodiment of the present disclosure with Butane being the target gas.

FIG. 19 illustrates the output of a sensor assembly, similar to the sensor assembly shown in FIG. 16, wherein the reference sensing device 522 is equipped with the flue and a filter 524. In the graph shown in FIG. 19, the target gas is butane. As shown, the target gas is intermittently being introduced to the sensor assembly and each time the target gas is introduced, the primary sensing device 520 experiences a spike above the nominal voltage (e.g., spikes 700A-700D), while the voltage of the reference sensing device 522 remains approximately constant due to the flue which does not allow passage of the gas therethrough or the filter absorbing the butane. In the example shown, a differential is used to show an instance in which a leak is occurring and are shown as spikes 710A-710D.

Figure 20:
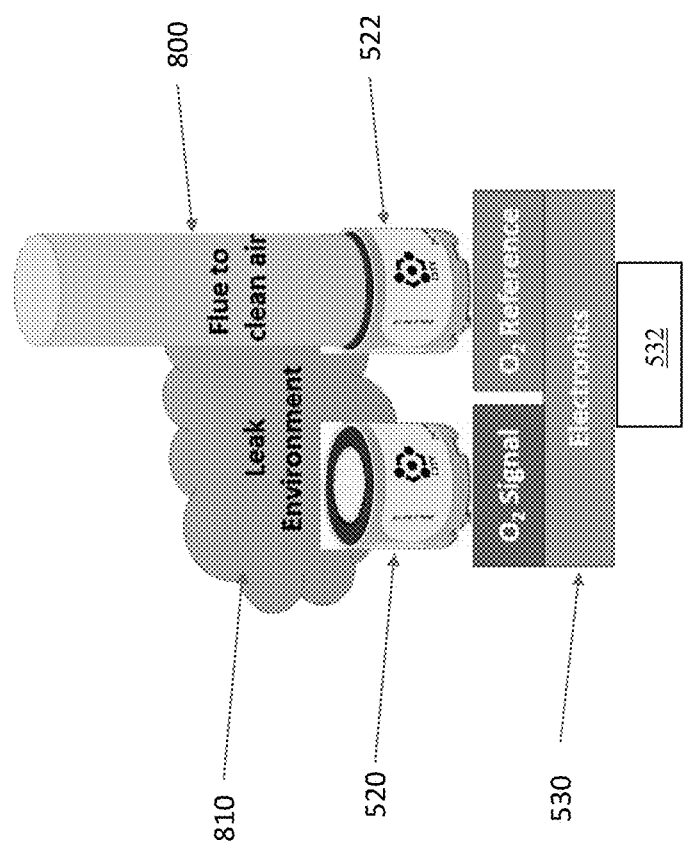
FIG. 20 is a block diagram of the sensor assembly, with a flue, configured in accordance with an example embodiment of the present disclosure.
Figure 21:
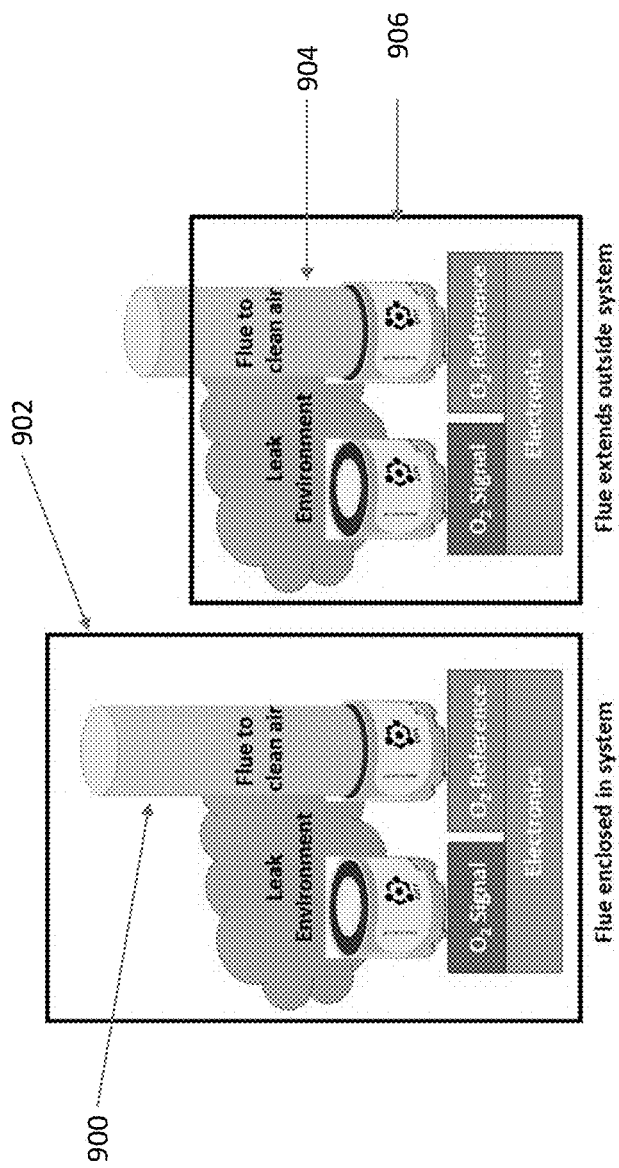
FIG. 21a illustrates an example block diagram of a flue enclosed sensor assembly configured in accordance with an example embodiment of the present disclosure.
FIG. 21b illustrates an example block diagram of a sensor assembly, with flue extending outside the closed system, configured in accordance with an example embodiment of the present disclosure.

FIG. 20 illustrates a block diagram of the sensor assembly similar to sensor assembly shown in FIG. 16 except the introduction of a flue 800 fitted on one side of the reference sensing device 522. The flue 800 enables the reference sensing device to be exposed to fresh air and away from a leak environment 810 or the area having the leaking gas. On the other hand, the primary sensing device 520 is exposed to A2L gas leaks being heavy in nature. In this regard, a differential signal can be calculated based on the exposure of leaking gas to the primary sensing devices 520 and ambient air to the reference sensing device 522. To this end, the flue 800 allows diffusion or passage of ambient air and keeps reference sensing device 522 away from the leaking gas. In this regard, the efficiency of the gas detection can be significantly enhanced based on the detection of variation in the gas concentration in a working environment.

In one exemplary embodiment, the primary sensing device 520 and the reference sensing device 522 are co-located to detect A2L gas leaks in AC systems. This differential sensor system has long lifetime, self-calibration capacity, and high reliability. The sensors are programmed to detect gas concentration after a predetermined time and compare based on the detected concentration. In this regard, based on the change in concentration of ambient air (or oxygen gas) the gas detection system re-calibrates the threshold values. Further, the system is highly reliable as both the primary sensing device 520 and the reference sensing device 522 are co-located in such a manner that these are exposed to identical environmental variables such as temperature, pressure, humidity having different gas exposure. Thus, the detector system detects minor changes in gas concentration which are depicted by the differential signal.

In one another embodiment, two oxygen sensors are used to measure the decrease in oxygen concentration due to a leak in A2L gas. In case of no leak, both sensors are exposed to ambient air resulting in zero differential signal. However, to detect A2L leak in an environment, primary sensing device 520 is exposed to the area having the leaking gas in order to detect change in oxygen concentration. At the same time, the flue 800 fitted reference sensing device 522 detects concentration of oxygen present in ambient air. In this regard, every time the primary sensing device 520 detects change in oxygen concentration, it is compared with the concentration of oxygen in ambient air. A control circuitry receives the signals from the primary sensing device 520 and reference sensing device 522 and compares the signals to determine a differential signal. Thereby, this differential signal indicates the change in oxygen concentration and in other words concentration of A2L gas in that environment. For example, a 1% change in the oxygen concentration (e.g., from 20.9% oxygen concentration to 20.7% oxygen concentration) may indicate 1% leakage gas (e.g., refrigerant) concentration can be detected with accuracy by the gas detection system.

In one another exemplary embodiment, the flue 800 includes a filter (not shown) fitted at an entrance of the flue 800 for preventing the passage of A2L to pass through the flue. This results in increased sensitivity as the reference sensing device 522 detects concentration of ambient air after filtering the A2L gases.

In one another exemplary embodiment, the gas detector system includes dual oxygen sensors, both configured to operate in an AC system. The sensor 1 is the primary sensing device 520 subjected to detect depletion of oxygen gas by having an exposure to the one or more refrigerant gases (e.g. A2L). Further, sensor 2 is the reference sensing device 522 which is fitted with the flue 800 extending to clean air (absence of one or more refrigerant gases on the order of >10 min). Both sensors work in collaboration to generate a steady state differential signal.

In one another exemplary embodiment, the gas detector system is designed to be independent of potential false alarms due to changes in temperature, pressure and humidity. Unlike in conventional dual oxygen sensor systems, the present gas detector does not trigger false alarms. Conventional oxygen sensors were operable to detect the concentration of oxygen in the environment and trigger alarms when the detected concentration level exceeds a predetermined level without calculating the relative oxygen concentration. The relative oxygen concentration is calculated by comparing the sensed oxygen concentration with a reference threshold. The reference threshold is calibrated based on the concentration of ambient oxygen at that time.

In one another exemplary embodiment, the recalibration of the predetermined threshold referred to as continuous self-check reading of $O_2$ level. In this regard, any type of $O_2$ dilution with heavy gases are detected, rendering this system applicable to different gases.

In one another exemplary embodiment, the positioning of the two sensors in proximity to each other results in a compact design, whereby the reference sensing device is co-located with all electrics, minimizing unit size and maximizing compensation performance. By having compact configuration, the errors or losses due to electric losses are minimized which results in highly accurate and sensitive signal output.

In one another exemplary embodiment, when the leak rate is high, the dual sensors are positioned at a bottom of a cabinet and leak is happening at the top of the flue. The flue is having a cylindrical shape having a cross section with an inner diameter of about 0.625 inches (0.0158 m) and a height of about 6 inches (0.152 m). The reference sensing device 522 exposed to air at top of the cabinet. The differential output is the difference between the primary sensing device 520 and the reference sensing device 522 with the flue 800.

In one another exemplary embodiment, the reference sensing device 522 can compensate for temperature, pressure, and humidity changes. An advantage is that any effects upon the senor of other ambient gases, such as $CO_2$, can be compensated to provide more accurate readings. This is especially useful in the case of oxygen sensors, but it also applies to other sensor technologies and interferents.

Further, design of the flue 800 is versatile from a system's design standpoint. In this regard, the flue 800 of different heights and different diameter can be used without interrupting a mean free path of the target gas.

In one another exemplary embodiment, the flue is a passive element and can be easily integrated to the existing systems of reference sensor. Further, no pump is associated with the sensing system in order to push the ambient air into the reference sensing device 522.

In another exemplary embodiment, the gas collection systems has a plurality of flues leading from various locations to the sensor. Multiple flues enable multiple sensing locations within the air handler unit, providing a safety factor for the HVAC manufacturers to ensure leaked gas is being detected independent of sensor location.

FIG. 21*a* is a block diagram of a flue 900 enclosed sensor assembly configured in accordance with an example embodiment of the present disclosure. In this regard, the sensor system is placed inside furnace near metering device. The primary sensing device 520 is exposed to conditions inside a furnace or other enclosed area 902 and the reference sensing device is modified with the flue 900 which can be run away from potential source of leak. In this manner, the flue 900 can be adjusted either at maximum height inside furnace or can be run outside containment of furnace as shown in FIG. 21*b*.

Referring to FIG. 21*b*, discloses a block diagram of the sensor assembly with the flue 904 extending outside the closed system 906. In both the configurations of FIG. 21*a* and FIG. 21*b*, the flue 904, extending away from the area having the leaking gas, is configured to provide ambient air to the reference sensing device 522.

Figure 22:
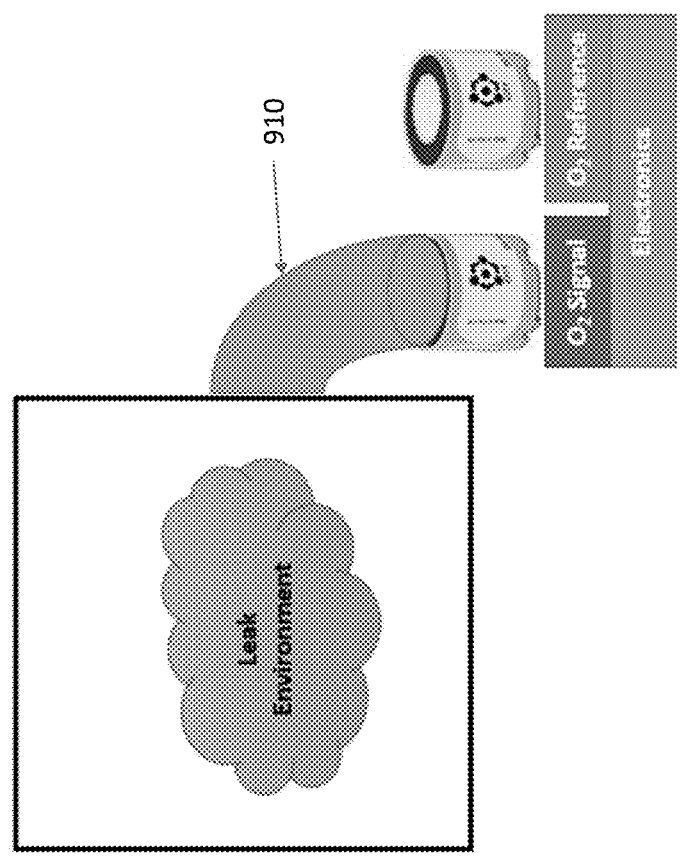
FIG. 22 illustrates an example block diagram of a sensor assembly configured in accordance with an example embodiment of the present disclosure.

FIG. 22 is a block diagram of a sensor assembly configured in accordance with an example embodiment of the present disclosure. As shown in FIG. 22, to determine the oxygen concentration, one end of a flue 910 is coupled with the primary sensing device 520 and a second end reaching to the gas leak environment. In this regard, the gas detector can detect the leak in gas by exposing the primary sensing device 520 to the leak environment via the flue 910 and the reference sensing device is adapted to be exposed to the ambient air. In one exemplary embodiment, the flue can have any shape or size depending on the requirements and dimensions of the flue 910 are such that, it allows the gas to diffuse or pass through freely without encroaching the mean free path of the gas. In this regard, the gas detector can be placed outside the cabinet, furnace, or container without compromising with the sensing quality of the gas detector. This arrangement helps in extended life span of the sensors and increased sensitivity due to the arrangement of the primary and reference sensing device on a printed circuit board (PCB).

In one another exemplary embodiment, the signal sensor is modified with the flue and exposed to conditions inside furnace by running the flue into the container or furnace where the one or more refrigerant gases is leaking. To this end, the reference sensor is open to conditions outside furnace containment and are not be subject to influence from the refrigerant leak In another exemplary embodiment of the present invention, by placing the primary and reference sensing device close enough to each other, signal delay can be eliminated to a greater extent due to signal loss in electronic circuits or transmissions. Thereby, with this structural arrangement, the signal to noise ratio can be increased as compared to conventional differential sensors and which results in improved response time. In this manner, by minimizing the delay time either due to structural constraints such as relative placement of the primary and reference sensing device or due to the transmission or electronic circuits, the sensitivity of the gas detector can be increased multiple times.

Further, in accordance with some example embodiments, the sensor assembly for determining a composition of one or more gases comprising a sensor assembly includes a primary sensing device and a reference sensing device located in proximity to the primary sensing device, a flue coupled with the reference sensing device at one end of the reference sensing device, wherein the reference sensing device is configured to determine, via the flue, a first oxygen concentration level of a given area, wherein the primary sensing device is configured to determine a second oxygen concentration level of the given area.

According to some example embodiments described herein, a control circuitry, electrically coupled with the primary sensing device and the reference sensing device, configured to receive the determined first and second oxygen concentration level from the primary sensing device and the reference sensing device, compare the first oxygen concentration level and the second oxygen concentration level, and based on the comparison, in an instance in which the second oxygen concentration level and the first oxygen concentration level have a difference greater than a threshold difference, cause a transmission that a gas leak is occurring.

Further, in accordance with some example embodiments, the primary sensing device and the reference sensing device are located within a sensor assembly and exposed to identical exposure of environmental variables.

Further, in accordance with some example embodiments, the gas detector further comprises a filter positioned on one side of the flue, wherein the filter is configured to screen out one or more gases from reaching the reference sensing device.

Further, in accordance with some example embodiments, the primary sensing device is adapted to be exposed to a potential leak source and the reference sensing device is adapted to be exposed to an environment other than the potential leak source under identical environmental variables.

Further, in accordance with some example embodiments, the threshold difference is based on between 5% and 10% of a volume of oxygen concentration level. To this end, the threshold difference is based on a flammability level of a gas. Further, the target gas is a refrigerant gas.

Further, in accordance with some example embodiments, the sensor assembly is further configured to receive one or more environmental variables and correcting the first oxygen concentration level reading and the second oxygen concentration level reading based on the environmental variables. The control circuitry comprising at least one processor, the at least one processor having computer coded instructions therein, with the computer instructions configured to, when executed, cause the operations of the sensor assembly by providing an alert signal. In this regard, the sensor assembly is a fully analog system or a digital system.

Further, in accordance with some example embodiments, a size of the flue is designed such that a mean free path of the gases being sensed is not encroached. In this regard, a diameter of the flue is about 100 times the mean free path of one of the measured gas and ambient air. Further, a response time of the sensing is adapted to remain within acceptable limits based on a length of the flue, wherein the length of the flue is about 0.1 meter to 3 meters. In some embodiments, the diameter of the flue is greater than 10 mm.

Further, in accordance with some example embodiments, a method of determining a gas leak with a sensor assembly, the sensor assembly comprising a primary sensing device and a reference sensing device, the method comprising determining, via a flue extension coupled with a reference sensing device, a first oxygen concentration level of a given area and determining, via a primary sensing device, a second oxygen concentration level of the given area. A control circuitry for comparing, the determined first oxygen concentration level and the second oxygen concentration level and triggering an alarm or notification based on the comparison, in an instance in which the first oxygen concentration level reading and the second oxygen concentration level reading have a difference greater than a threshold difference.

Further, in accordance with some example embodiments, exposing each of the primary sensing device and the reference sensing device to identical environmental variables, wherein the environmental variables include at least one of temperature, pressure, and humidity.

Further, in accordance with some example embodiments, the flue extension is configured to screen out one or more target gases from reaching the reference sensing device.

Further, in accordance with some example embodiments, the primary sensing device is adapted to be exposed to a potential leak source and the reference sensing device is adapted to be exposed to an environment other than the potential leak source under identical environmental variables. A diameter of the flue is about 100 times a mean free path of one or more target gases.

Further, in accordance with some example embodiments, receiving one or more environmental variables and correcting the first oxygen concentration level reading and the second oxygen concentration level reading based on the environmental variables. The method is carried out via at least one processor.

An advantage of using a flue on either the sensing and/or the reference sensor(s) is that the sensors are allowed to passively access gas from a different part of the HVAC system. This also means that the sensors can be located in less challenging environmental conditions. For example, the region where a gas leak might accumulate could be subject to a harsh environment, such as wide temperature and/or RH swings and the sensors can be connected through the flue with these areas. Using flues as described allows the sensors to be mounted in a more benign region that has a consistent temperature. The sensor may also be spaced from where the gas leak might accumulate to provide an environment that has a lower operating temperature. Spacing the sensors from the harsh environment allow the sensors to provide a more accurate performance, minimize compensation and referencing difficulties to reduce false alarms and increase sensor life.

Various embodiments discussed herein allow for monitoring and detection of gas leaks, such as in refrigeration units during operation. While various embodiments discuss refrigeration units, various embodiments discussed herein may also be used for other types of gas leaks, such as in HVAC applications and/or the like using closed-loop cycles. Refrigeration units include closed-loop cooling/refrigerant coils that contain flammable refrigerants. A2L refrigerants are being used more often in such refrigeration units due to a lower global warming potential (GWP) and therefore regulations have been put into place in various countries to monitor leakage to avoid dangerous conditions during use. While A2L refrigerants have generally low toxicity and only mild flammability, large leaks can still cause dangerous situations. Therefore, monitoring and detection of such leaks are necessary for refrigerant units. Various embodiments of the present disclosure allow for a simple, yet effective leakage monitoring system.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments set forth herein will come to mind to one skilled in the art to which these disclosures pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A sensor assembly comprising:
a first sensing device,
a second sensing device located in proximity to the first sensing device, wherein the second sensing device is oriented differently from the first sensing device such that one of the first sensing device and the second sensing device determines a first concentration level of a first gas in a first area simultaneously with the other of the first sensing device and the second sensing device determining a second concentration level of the first gas in a second area; and
a flue coupled with one of the first sensing device and the second sensing device to provide a pathway for the first gas in the first area to access the one of the first sensing device and the second sensing device, wherein the one of the first sensing device and the second sensing device coupled to the flue is configured to determine the first concentration level of the first gas in the first area and the other of the first sensing device and the second sensing device is configured to determine the second concentration level of the first gas in the second area.

2. The sensor assembly of claim 1, further comprises an electrical circuit electrically coupled with the first sensing device and the second sensing device, configured to:
receive the first concentration level and the second concentration level,
compare the first concentration level and the second concentration level to determine a reading difference between the first concentration level and the second concentration level, and
based on the comparison, in an instance in which the reading difference is greater than a predetermined threshold difference, cause a transmission of a signal identifying that a leak of the first gas is occurring.

3. The sensor assembly of claim 1, wherein the first sensing device and the second sensing device are configured to be exposed to substantially identical environmental variables.

4. The sensor assembly of claim 1, further comprises a filter positioned and configured to screen out one or more gases from reaching the second sensing device.

5. The sensor assembly of claim 1, wherein the first sensing device is adapted to be exposed to a potential leak source in the first area.

6. The sensor assembly of claim 2, wherein the predetermined threshold difference is based on between 5% and 10% of a volume of the first gas.

7. The sensor assembly of claim 2, wherein the predetermined threshold difference is based on a flammability level of the first gas.

8. The sensor assembly of claim 1, wherein the first gas is a refrigerant.

9. The sensor assembly of claim 1, wherein the sensor assembly is further configured to receive one or more environmental variables and correcting the first concentration level reading and the second concentration level reading based on the one or more environmental variables.

10. The sensor assembly of claim 1, further comprising a control circuitry comprising at least one processor, the at least one processor having computer coded instructions configured to, when executed, provide an alert signal.

11. The sensor assembly of claim 1, wherein the sensor assembly is one of a fully analog system and a digital system.

12. The sensor assembly of claim 1, wherein the flue has an opening therethrough, the opening having cross-sectional area, wherein a square root of the cross-sectional area yields a length that is larger than a mean free path of the first gas.

13. The sensor assembly of claim 12, wherein the square root of the cross-sectional area yields the length that is larger than about 100 times the mean free path of the first gas.

14. The sensor assembly of claim 1, wherein a response time of the sensing is adapted to remain within acceptable limits based on a length of the flue, wherein the length of the flue is about 0.1 meter to 3 meters.

15. A method of determining a gas leak with a sensor assembly, the sensor assembly comprising a first sensing device and a second sensing device that is oriented differently from the first sensing device, the method comprising:
determining, via a flue extension coupled with the second sensing device, a first gas concentration level of a first gas in a given area;
determining, via the first sensing device, a second gas concentration level of a second gas in the given area, wherein the first sensing device is oriented differently from the second sensing device such that the first sensing device determines the second gas concentration level of the second gas in the given area simultaneously with the second sensing device determining the first gas concentration level of the first gas in the given area;
comparing, using a control circuitry, the determined first gas concentration level and the second gas concentration level; and
based on the comparison, in an instance in which the first gas concentration level reading and the second gas concentration level reading have a difference greater than a threshold difference, causing a transmission of a differential output that the gas leak is occurring.

16. The method of claim 15, further comprising exposing each of the first sensing device and the second sensing device to identical environmental variables, wherein the environmental variables include at least one of temperature, pressure, and humidity.

17. The method of claim 15, wherein the flue extension is configured to screen out one or more target gases from reaching the second sensing device.

18. The method of claim 15, wherein the first sensing device is adapted to be exposed to a potential leak source and the second sensing device is adapted to be exposed to an environment other than the potential leak source under identical environmental variables.

19. The method of claim 15, wherein a diameter of a flue is about 10 times a mean free path of one or more target gases.

20. The method of claim 15, further comprising receiving one or more environmental variables and correcting the first gas concentration level reading and the second gas concentration level reading based on the one or more environmental variables.

* * * * *